US012732340B2

(12) United States Patent
Kim et al.

(10) Patent No.: US 12,732,340 B2
(45) Date of Patent: Sep. 8, 2026

(54) EVALUATING CONVOLUTIONS USING ENCRYPTED DATA

(71) Applicant: Western Digital Technologies, Inc., San Jose, CA (US)

(72) Inventors: Dongwoo Kim, San Jose, CA (US); Cyril Guyot, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 252 days.

(21) Appl. No.: 18/231,716

(22) Filed: Aug. 8, 2023

(65) Prior Publication Data

US 2024/0171372 A1 May 23, 2024

Related U.S. Application Data

(60) Provisional application No. 63/423,952, filed on Nov. 9, 2022.

(51) Int. Cl.
*H04L 9/08* (2006.01)
*H04L 9/00* (2022.01)
(Continued)

(52) U.S. Cl.
CPC ................ *H04L 9/008* (2013.01); *H04L 9/06* (2013.01); *H04L 9/3026* (2013.01)

(58) Field of Classification Search
CPC ......... H04L 9/008; H04L 9/06; H04L 9/3026; H04L 9/3093
See application file for complete search history.

(56) References Cited

U.S. PATENT DOCUMENTS

| | | | |
|---|---|---|---|
| 8,630,422 | B2 | 1/2014 | Gentry |
| 9,800,517 | B1 | 10/2017 | Anderson |

(Continued)

FOREIGN PATENT DOCUMENTS

| | | | | | |
|---|---|---|---|---|---|
| CN | 111984990 | B | | 2/2022 | |
| EP | 4694027 | A1 | * | 2/2026 | ............... H04L 9/14 |
| WO | WO-2022191770 | A1 | * | 9/2022 | ......... G06F 21/6245 |

OTHER PUBLICATIONS

Dongwoo Kim, Cyril Guyot; "Optimized Privacy-Preserving CNN Inference With Fully Homomorphic Encryption"; IEEE Transactions on Information Forensics and Security; vol. 18; Mar. 2023; pp. 2175-2187 (Year: 2023).*

(Continued)

*Primary Examiner* — Fatoumata Traore
*Assistant Examiner* — Courtney D Fields
(74) *Attorney, Agent, or Firm* — Barry IP Law, P.C.

(57) ABSTRACT

A client device encodes one or more input datasets of real numbers into a plaintext polynomial with integral coefficients that do not include an imaginary component and generates an input ciphertext by encrypting the plaintext polynomial according to a Fully Homomorphic Encryption (FHE) scheme. The input ciphertext includes at least encrypted coefficients of an input polynomial. A server receives the input ciphertext and performs a convolution on the input ciphertext using a kernel by at least in part separately multiplying the input polynomial by one or more kernel polynomials to result in one or more corresponding convolved polynomials. The one or more kernel polynomials include kernel coefficients encoded using kernel values for the kernel. At least a plurality of coefficients is used from each of the one or more convolved polynomials to derive an output ciphertext representing an output of the convolution on the input ciphertext using the kernel.

21 Claims, 10 Drawing Sheets

(51) Int. Cl.

| | |
|---|---|
| ***H04L 9/06*** | (2006.01) |
| ***H04L 9/30*** | (2006.01) |
| *H04L 9/14* | (2006.01) |
| *H04L 9/32* | (2006.01) |

(56) References Cited

U.S. PATENT DOCUMENTS

| | | | | |
|---|---|---|---|---|
| 10,944,552 | B2 | 3/2021 | Leong et al. | |
| 12,001,577 | B1 * | 6/2024 | Xiong | G06N 3/04 |
| 2012/0039473 | A1 * | 2/2012 | Gentry | H04L 9/3026 380/277 |
| 2016/0119119 | A1 | 4/2016 | Calapodescu et al. | |
| 2017/0134158 | A1 | 5/2017 | Pasol et al. | |
| 2017/0180115 | A1 * | 6/2017 | Laine | H04L 9/0618 |
| 2018/0234253 | A1 | 8/2018 | Camenisch et al. | |
| 2019/0386814 | A1 | 12/2019 | Ahmed | |
| 2020/0387777 | A1 | 12/2020 | Avestimehr et al. | |
| 2021/0328765 | A1 * | 10/2021 | Lee | H04L 9/008 |
| 2022/0060314 | A1 | 2/2022 | Sehrawat et al. | |
| 2023/0027010 | A1 | 1/2023 | Raynal et al. | |
| 2025/0038948 | A1 | 1/2025 | Veneroso | |

OTHER PUBLICATIONS

Aliasgari et al.; "Distributed and Private Coded Matrix Computation with Flexible Communication Load"; Jan. 2019; available at: https://arxiv.org/pdf/1901.07705.pdf.

Cheon et al.; "Homomorphic encryption for arithmetic of approximate numbers; International Conference on the Theory and Application of Cryptology and Information Security"; Sep. 2017; available at: https://eprint.iacr.org/2016/421.pdf.

Dathathri et al.; "Eva: An encrypted vector arithmetic language and compiler for efficient homomorphic computation"; Proceedings of the 41st ACM SIGPLAN Conference on Programming Language Design and Implementation; 2020; available at: https://arxiv.org/abs/1912.11951.

Dutta et al.; "On the optimal recovery threshold of coded matrix multiplication"; IEEE Transactions on Information Theory; 2019; available at: https://arxiv.org/pdf/1801.10292.pdf.

Jahani-Nezhad et al.; "Berrut approximated coded computing: Straggler resistance beyond polynomial computing"; Feb. 2022; available at: https://arxiv.org/pdf/2009.08327.pdf.

Jeong et al.; "Approximate coded matrix multiplication is nearly twice as efficient as exact multiplication is nearly twice as efficient as exact multipliation"; 2021; available at: https://arxiv.org/pdf/2105.01973.pdf.

Kanagavalli et al.; "Big Data Security using Homomorphic Encryption"; Turkish Journal of Computer and Mathematics Education; 2021.

Kumar et al.; "Privacy preserving, verifiable and efficient outsourcing algorithm for matrix multiplication to a malicious cloud server"; Mar. 2017; available at: https://www.tandfonline.com/doi/full/10.1080/23311916.2017.1295783.

Pulido-Gaytan et al.; "A Survey on Privacy-Preserving Machine Learning with Fully Homomorphic Encryption"; Sep. 2020; available at: https://www.researchgate.net/publication/344122938_A_Survey_on_Privacy-Preserving_Machine_Learning_with_Fully_Homomorphic_Encryption.

Ramamoorthy et al.; "Universally Decodable Matrices for Distributed Matrix-Vector Multipliation"; Jan. 2019; available at: https://arxiv.org/pdf/1901.10674.pdf.

So et al.; "CodedPrivateML: A Fast and Privacy-Preserving Framework for Distributed Machine Learning"; Jan. 2021; available at: https://eprint.iacr.org/2019/140.pdf.

Tegin et al.; "Straggler Mitigation through Unequal Error Protection for Distributed Matrix Multiplication"; 2021; available at: http://repository.bilkent.edu.tr/bitstream/handle/11693/77047/Straggler_Mitigation_through_Unequal_Error_Protection_for_Distributed_Matrix_Multiplication.pdf?sequence=1.

Troncoso-Pastoriza et al.; "Privacy-Preserving Data Sharing and Computation Across Multiple Data Providers with Homomorphic Encryption"; Jan. 2022; available at: https://link.springer.com/chapter/10.1007/978-3-030-77287-1_3.

Yu et al.; "Straggler Mitigation in Distributed Matrix Multiplication: Fundamental Limits and Optimal Coding"; IEEE Transactions on Information Theory; Jan. 2018; available at: https://arxiv.org/abs/1801.07487.

Yu et al.; "Polynomial Codes: an Optimal Design for High-Dimensional Coded Matrix Multiplication"; Jan. 2018; available at: https://arxiv.org/abs/1705.10464.

Aganya et al.; "Symmetric Fully Homomorphic Encryption Scheme with Polynomials Operations"; Mar. 2018; available at: https://ieeexplore.ieee.org/document/8474729.

Kim et al.; "ARK: Fully Homomorphic Encryption Accelerator with Runtime Data Generation and Inter-Operation Key Reuse"; May 2022; available at: https://arxiv.org/abs/2205.00922.

Hilder Vitor Lima Pereira; "Bootstrapping fully homomorphic encryption over the integers in less than one second"; Aug. 2020; available at: https://eprint.iacr.org/2020/995.

Han et al.; "Efficient Privacy Preserving Logistic Regression Inference and Training"; Nov. 2020; available at: https://eprint.iacr.org/2020/1396.

Migliore et al.; "Exploration of Polynomial Multiplication Algorithms for Homomorphic Encryption Schemes"; Dec. 2015; available at: https://ieeexplore.ieee.org/document/7393307.

Choi et al.; "Impala: Low-Latency, Communication-Efficient Private Deep Learning Inference"; May 2022; available at: https://arxiv.org/abs/2205.06437.

Viand et al.; "SoK: Fully Homomorphic Encryption Compilers"; Jan. 2021; available at: https://arxiv.org/abs/2101.07078.

Pending U.S. Appl. No. 18/231,706, filed Aug. 8, 2023, entitled "Privacy-Preserving Distributed Computing", Dongwoo Kim.

* cited by examiner

EVALUATING CONVOLUTIONS USING ENCRYPTED DATA

CROSS-REFERENCE TO RELATED APPLICATION

This application claims the benefit of U.S. Provisional Application No. 63/423,952 titled “EVALUATING CONVOLUTIONS USING ENCRYPTED DATA”, filed on Nov. 9, 2022, which is hereby incorporated by reference in its entirety.

BACKGROUND

Current trends in cloud computing and data analysis have led to an increase in Machine Learning (ML) as a Service (MLaaS). Since ML can include a significant number of calculations, costly hardware, and specially trained neural networks, clients using MLaaS can provide their data to a service provider to perform analysis on their data using neural networks and then receive the analysis from the service provider. In some cases, the data being analyzed can include sensitive data, such as medical data, financial data, or other personal data. Although the service provider (e.g., a MLaaS provider) may be trusted by the client, the service provider, its network, or the network between the client and the service provider may become compromised, thereby exposing the data sent by the client to the service provider and/or the result of the analysis provided to the client from the service provider.

Various types of homomorphic encryption, such as a Cheon Kim Kim Song (CKKS) encryption scheme, have been developed to allow encrypted data to be sent to a service provider and remain encrypted during arithmetic operations performed by the service provider, without the service provider decrypting the encrypted data in performing the operations. The service provider then sends an encrypted result back to the client, which decrypts the encrypted result using a secret key. Such homomorphic encryption can safeguard the data provided by the client and the result of the analysis if the service provider or the communication network between the client and the service provider becomes vulnerable.

However, such homomorphic encryption schemes have not been used with deep or wide Convolutional Neural Networks (CNN) since operations performed on data using such homomorphic encryption schemes significantly increase the computational complexity. This has prevented the practical use of homomorphic encryption with CNNs, which would create a significant processing bottleneck in terms of latency when using encrypted data to perform convolutions of the CNN.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Systems

Figure 1:
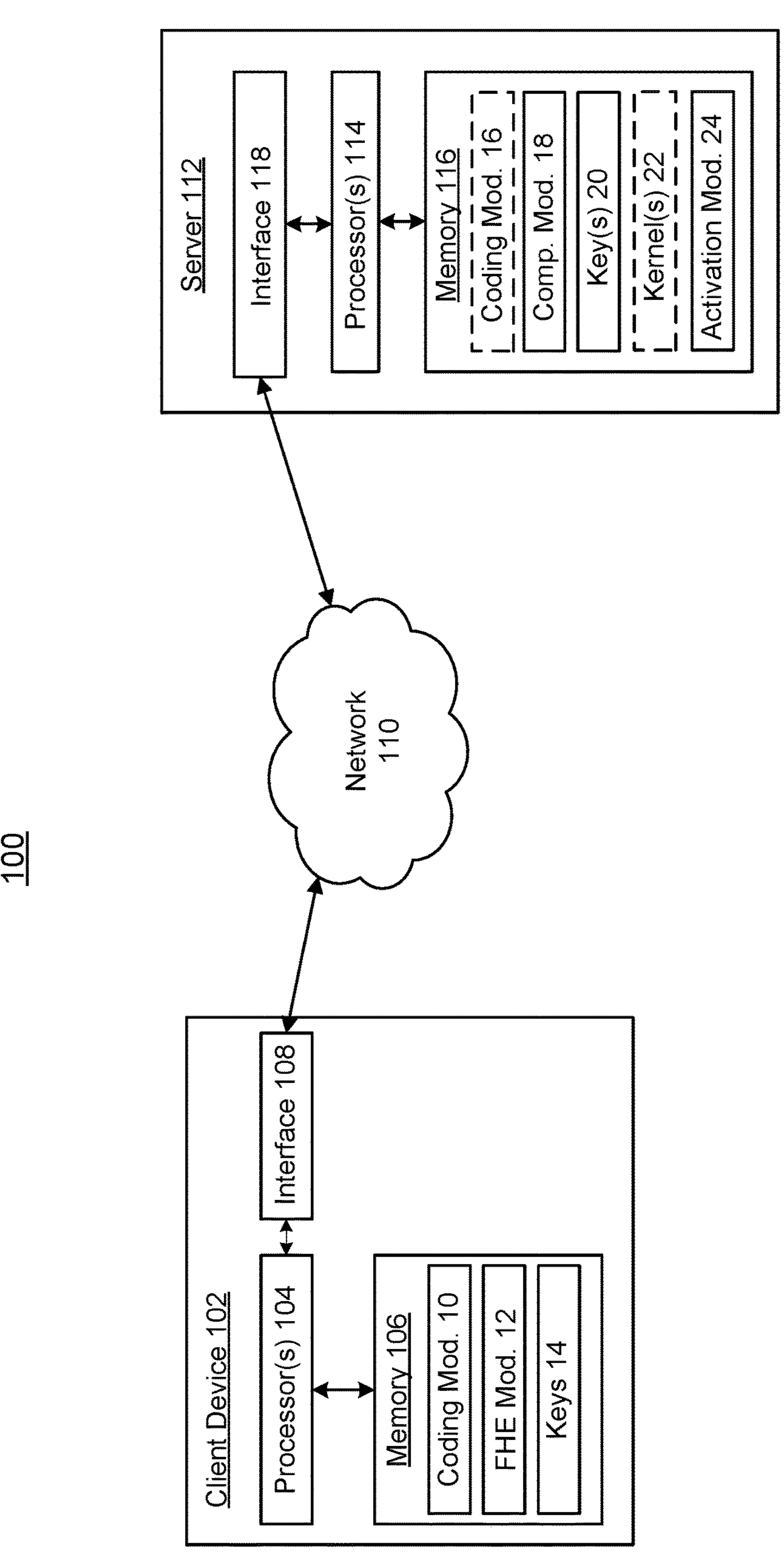
FIG. 1 is a block diagram of an example system for evaluating convolutional layers using encrypted data according to one or more embodiments.

FIG. 1 illustrates example system 100 for evaluating convolutions using encrypted data according to one or more embodiments. In the example of FIG. 1, client device 102 sends encrypted data to server 112 via network 110 for server 112 to perform one or more convolutions on the encrypted data. Server 112 may also be used by client device 102 to evaluate one or more convolutional layers of a Convolutional Neural Network (CNN). In this regard, server 112 may perform operations on encrypted data provided by client device 102 to provide Machine Learning as a Service (MLaaS). After performing the operations, server 112 returns an encrypted result to client device 102. In some implementations, server 112 may be provided as part of a cloud service for client device 102. In some cases, server 112 may also be used by other client devices for performing operations, such as evaluating convolutions or convolutional layers. In other implementations, system 100 may include multiple servers in addition to server 112 for performing operations on data received from one or more client devices.

Network 110 can include, for example, a Storage Area Network (SAN), a Local Area Network (LAN), and/or a Wide Area Network (WAN), such as the Internet. In this regard, one or more of client device 102 and server 112 may not be physically co-located. Client device 102 and server 112 may communicate using one or more standards such as, for example, Ethernet or Fibre Channel.

Client device 102 includes one or more processors 104, interface 108, and memory 106. Processor(s) 104 can execute instructions, such as instructions from one or more applications loaded from memory 106, and can include circuitry such as, for example, a Central Processing Unit (CPU) (e.g., one or more Reduced Instruction Set Computer (RISC)-V cores), a Graphics Processing Unit (GPU), a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor(s) 104 can include a System on a Chip (SoC), which may be combined with memory 106.

Memory 106 can include, for example, a volatile Random Access Memory (RAM) such as Static RAM (SRAM), Dynamic RAM (DRAM), or a non-volatile RAM, or other solid-state memory that is used by processor(s) 104. Data stored in memory 106 can include, for example, data to be encrypted before being sent to server 112 and encrypted results received from server 112 that are decrypted to derive a final result, in addition to instructions loaded from one or more applications for execution by processor(s) 104, and/or data used in executing such applications, such as keys 14.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 106 may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

As shown in the example of FIG. 1, memory 106 stores coding module 10, Fully Homomorphic Encryption (FHE) module 12, and keys 14. As discussed in more detail below with reference to FIG. 2, one or more processors 104 use coding module 10 to encode input datasets of real numbers into a plaintext polynomial. The one or more processors 104 can then use FHE module 12 to encrypt the plaintext polynomial into an input ciphertext that is sent to server 112 via interface 108. For its part, interface 108 may communicate with server 112 via network 110 using, for example, Ethernet or Fibre Channel. Interface 108 may include, for example, a Network Interface Card (NIC), a network interface controller, or a network adapter.

Server 112 in the example of FIG. 1 includes an interface 118, one or more processors 114, and a memory 116. Processor(s) 114 can execute instructions, such as instructions from one or more applications loaded from memory 116. In this regard, server 112 and client device 102 may each execute portions of a distributed application (e.g., coding module 10, FHE module 12, coding module 16, computing module 18, and activation module 24) that configure client device 102 and server 112 to operate as a system for evaluating at least one convolution or convolutional layer based on one or more input ciphertexts sent from client device 102 to server 112. Processor(s) 114 can include circuitry such as, for example, a CPU (e.g., one or more RISC-V cores), a GPU, a microcontroller, a DSP, an ASIC, an FPGA, hard-wired logic, analog circuitry and/or a combination thereof. In some implementations, processor(s) 114 can include an SoC, which may be combined with memory 116.

Memory 116 can include, for example, a volatile RAM such as SRAM, DRAM, or a non-volatile RAM, or other solid-state memory that is used by processor(s) 114. Data stored in memory 116 can include, for example, a ciphertext to be used as an input for performing a convolution or an encrypted output (i.e., an output ciphertext) resulting from the convolution. In addition, memory 116 can store instructions loaded from one or more applications for execution by processor(s) 114, such as computing module 18, and/or data used in executing such applications, such as one or more keys 20. As discussed in more detail below, key(s) 20 can include one or more evaluation keys used as part of a FHE scheme that enables convolutions to be performed on encrypted data and to return an encrypted result that can be decrypted using a secret key stored in memory 106 of client device 102.

As shown in FIG. 1, memory 116 may also store one or more kernels 22, coding module 16, and activation module 24. As discussed in more detail below with reference to FIG. 2, kernel(s) 22 can include, for example, kernel values representing weights in a matrix that are used to perform one or more convolutions on at least one ciphertext. Activation module 24 can be used by server 112 to evaluate a convolutional layer, such as in a CNN. As discussed in more detail below with reference to FIG. 5, activation module 24 can implement a modified bootstrapping to reduce the noise or error resulting from performing arithmetic operations on data encrypted according to an FHE scheme while efficiently evaluating an activation function, unlike conventional bootstrapping. Coding module 16 can be used by server 112 in some implementations to encode kernels into one or more kernel polynomials for performing a convolution on an input ciphertext.

For its part, interface 118 may communicate with client device 102 via network 110 using, for example, Ethernet or Fibre Channel. Each network interface 118 may include, for example, a NIC, a network interface controller, or a network adapter.

Those of ordinary skill in the art will appreciate with reference to the present disclosure that system 100 in FIG. 1 is for the purposes of illustration and that other implementations may include other components not shown in FIG. 1. For example, other implementations of system 100 can include switches or routers not shown in FIG. 1. Other implementations of system 100 can include many more servers 112 that may be responsible for performing different parts of a CNN, for example. In addition, other implementations of system 100 can include multiple client devices 102 that may send different input ciphertexts to one or more servers in system 100.

As yet another example variation, the particular modules and arrangements of memory may differ in other implementations, such as with a consolidation of coding module 10 and FHE module 12 into a single security module and/or the consolidation of computing module 18 and activation module 24 into a single convolutional layer evaluation module in some implementations. In other variations, key(s) 20 or kernels 22 may not be stored in server 112 and may be accessed from another server or from client device 102. In some implementations, server 112 may receive already encoded and/or encrypted kernels from another server or device. Server 112 may not need coding module 16 in such implementations since the kernels may already be encoded into kernel polynomials when received by server 112.

Figure 2:
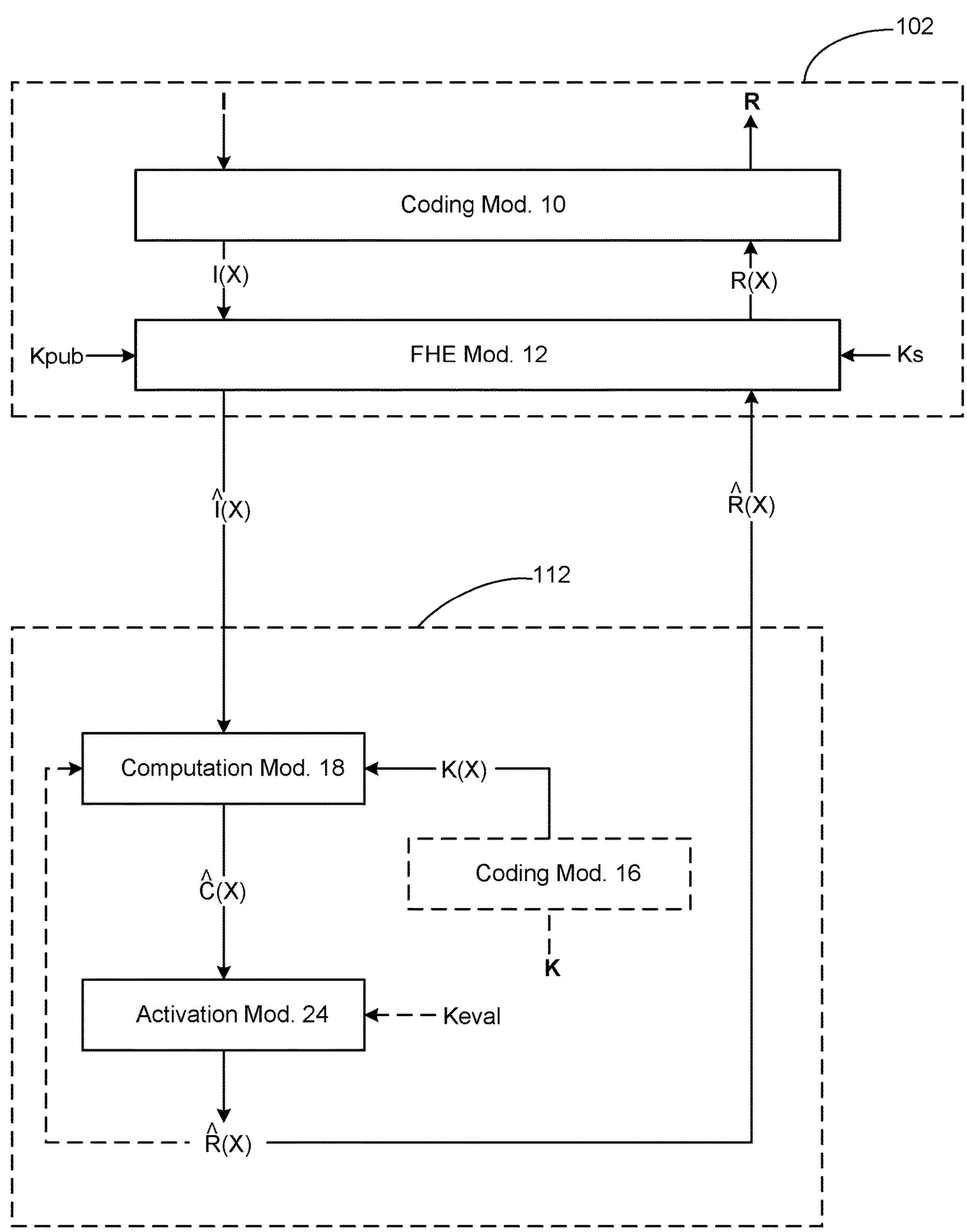
FIG. 2 is a block diagram of an example dataflow in the system of FIG. 1 according to one or more embodiments.

FIG. 2 provides an example dataflow in the system of FIG. 1 according to one or more embodiments. As shown in FIG. 2, coding module 10 of client device 102 encodes an input dataset I of real numbers to generate plaintext polynomial I(X). In some implementations, input dataset I can represent a matrix or vector of input values to a CNN. As used herein, bolded letters or expressions can represent matrices or vectors. As discussed in more detail below, the plaintext polynomial includes integral coefficients.

In the example of FIG. 2, the encoded plaintext polynomial I(X) is then encrypted using FHE module 12 to generate an input polynomial $\hat{I}(X)$, which can be referred to as an input ciphertext or can at least be represented by an input ciphertext, such as by including the coefficients of the input polynomial and an indication of a degree of each term, for example. In encrypting the plaintext polynomial, FHE module 12 uses a public key of keys 14 to encrypt the plaintext polynomial according to an FHE scheme. The hat accents in FIG. 2 (e.g., as in $\hat{I}(X)$) indicate encrypted data. Client device 102 then sends the input ciphertext $\hat{I}(X)$ to server 112 via interface 108 for server 112 to perform at least one convolution on the input ciphertext. In some implementations, the input ciphertext may include an input polynomial or indicate the coefficients of terms in such an input polynomial.

As will be appreciated by those of ordinary skill in the art with reference to the present disclosure, a Cheon Kim Kim Song (CKKS) scheme can be used for FHE that allows approximate arithmetic with encryption and decryption algorithms (Enc/Dec) using the ring of polynomials $\mathcal{R}=\mathbb{Z}[X]/(X^N+1)$ as a plaintext space, where $\mathbb{Z}[X]$ denotes integral coefficients of the polynomials in the ring. Such a CKKS scheme is described in the paper by J. H. Cheon, A. Kim, M. Kim, and Y. Song, "Homomorphic Encryption for Arithmetic of Approximate Numbers", in *International Conference on the Theory and Application of Cryptology and Information Security*, Springer, November 2017, pgs. 409-437, which is hereby incorporated by reference in its entirety. Using input messages $m_1, m_2 \in \mathcal{R}$, the addition and multiplication of the input messages can be expressed as:

$$Dec(Enc(m_1) \boxplus Enc(m_2)) \approx m_1 + m_2 \qquad \text{Eqs. 1}$$

$$Dec(Enc(m_1) \boxdot Enc(m_2)) \approx m_1 \cdot m_2$$

where $\boxplus$ and $\boxdot$ denote ciphertext addition and multiplication, respectively. As shown by Equations 1 above, the decoded results of the ciphertext addition or ciphertext multiplication of the encrypted messages is approximately equal to the addition or multiplication, respectively, of the messages within a bounded error.

The CKKS scheme uses the plaintext space $\mathcal{R}$ for messages of complex numbers with an encoding algorithm ($Ecd_\Delta$: $\mathbb{C}^{N/2} \to \mathcal{R}$) and a decoding algorithm ($Dcd_\Delta$: $\mathcal{R} \to \mathbb{C}^{N/2}$) parameterized by a scaling factor Δ, which controls the precision of the following arithmetic operations in Equations 2 below, that for $z_1, z_2 \in \mathbb{C}^{N/2}$:

$$Dcd_\Delta(Ecd_\Delta(z_1) + Ecd_\Delta(z_2)) \approx z_1 \oplus z_2 \qquad \text{Eqs. 2}$$

$$Dcd_\Delta(Ecd_\Delta(z_1)\, Ecd_\Delta(z_2)) \approx z_1 \odot z_2$$

where $\oplus$ and $\odot$ denote the component-wise addition and Hadamard product of vectors, respectively, and C denotes a ring of complex numbers. With these encoding and decoding algorithms, the CKKS scheme encrypts a vector of complex numbers into a ciphertext and can perform addition or multiplication on the vectors with the foregoing ciphertext operations. The CKKS scheme also uses a rotation operation denoted by Rot. For an input ciphertext ct, the rotation operation outputs a ciphertext $ct_{rot}$=Rot(ct, j), which has a message vector rotated j steps left from the input vector, which can be represented as:

$$Dcd(Dec(ct_{rot})) \approx (z_j, z_{j+1}, \ldots, z_{N/2-1}, Z_0, \ldots, z_{j-1}) \qquad \text{Eq. 3}$$

where $(z_0, z_1, \ldots, z_{N/2-1})$=Dcd(Dec(ct)). By using the rotation operations, the CKKS scheme can represent any arithmetic function with vectorized operations.

The computational cost of FHE for evaluating a given function primarily depends on the number of ciphertext multiplications and rotations required to represent the function. In addition, each ciphertext in the CKKS scheme has a level that can be denoted by $\ell \in \{0, 1, \ldots, L\}$ and a certain number of least significant digits of the messages can be truncated by decreasing the level of the ciphertexts. Notably, ciphertexts of a higher level are larger and have a greater computational cost. In general, performing computations of multiplicative depth L requires a ciphertext of level L as an input, where the multiplicative depth refers to the number of sequential encrypted or homomorphic multiplications that can be performed on the ciphertext and still be able to accurately decrypt the result.

To continue operations on a ciphertext of level 0, a bootstrapping can be performed as discussed in the paper by J. H. Cheon, A. Kim, K. Kim, and Y. Song, "Bootstrapping for Approximate Homomorphic Encryption", in *Annual International Conference on the Theory and Applications of Cryptographic Techniques*, Springer, 2018, pgs. 360-384, which is hereby incorporated by reference in its entirety. The bootstrapping outputs a new ciphertext of level L having similar messages. However, such bootstrapping typically requires a significant number of computations and has been mostly abandoned in prior works on Privacy Preserving Machine Learning (PPML) by being limited to inferences of low multiplicative depth. The evaluation of convolutions on encrypted data and the modified bootstrapping disclosed herein enable the evaluation of convolutional layers of CNNs, including deep CNNs.

A two-dimensional evaluation of a convolution without encrypted data can be represented as:

$$Conv(I, K)_{i,j} = \sum_{0 \le i', j' < k} K_{i',j'} \cdot I_{i+i',j+j'} \qquad \text{Eq. 4}$$

with $I \in \mathbb{R}^{w \times w}$ being an input matrix representing, for example, image data, $K \in \mathbb{R}^{k \times k}$ being a kernel, and $\mathbb{R}$ denoting a ring of real numbers. The subscript i, j denotes the i-th row and j-th column of a matrix and 0≤i, j<d, and d=w−k+1.

A batched convolution with BB' kernels, which can be represented as: $K^{(B,B')}=(K^{0,0}, \ldots, K^{i,i'} \in \mathbb{R}^{k \times k}, \ldots, K^{B-1,B'-1})$, on B-batched inputs $I^{(B)}=(I^0, \ldots, I^i \in \mathbb{R}^{w \times w}, \ldots, I^{B-1})$ outputs B' batch outputs $0 \leq b' < B'$ as follows:

$$Conv\left(I^B, K^{(B,B')}\right)^{b'} = \sum_{0 \leq i < B} Conv\left(I^i, K^{i,b'}\right) \quad \text{Eq. 5}$$

where the superscripts b' and i denote the b'-th and i-th batches, respectively.

Evaluating a convolution using FHE can be performed with a reduced computational cost than previous schemes, such as CKKS, by using a different encoding and by multiplying an input polynomial by a kernel polynomial representing an encoded kernel matrix K in $\mathcal{R}=\mathbb{Z}[X]/(X^N+1)$. The kernel or a batch portion of the kernel can be encoded into the kernel polynomial with kernel values from the kernel forming coefficients of terms in the kernel polynomial.

Instead of using the conventional CKKS encoding and decoding discussed above that uses the plaintext space $\mathcal{R}$ for messages of complex numbers with $Ecd_\Delta$: $\mathbb{C}^{N/2} \rightarrow \mathcal{R}$ and $Dcd_\Delta$: $\mathcal{R} \rightarrow \mathbb{C}^{N/2}$, the encoding and decoding of the present disclosure encodes and decodes the message vector directly into or from coefficients of a plaintext polynomial in a way that is more efficient for evaluating convolutions. This new convolutional FHE encoding and decoding is represented with Cf-$Ecd_\Delta$ and Cf-$Dcd_\Delta$ in Relations 6 below.

$$\begin{aligned} &Cf-Ecd_\Delta\left((r_0, r_1, \ldots, r_{N-1}) \in \mathbb{R}^N\right) \rightarrow \\ &\left\lfloor \Delta \cdot \left(r_0 + r_1 X + \ldots + r_{N-1} X^{N-1}\right)\right\rceil \in \mathcal{R} \\ &Cf-Dcd_\Delta\left((m_0 + m_1 X + \ldots + m_{N-1} X^{N-1}) \in \mathcal{R}\right) \rightarrow \\ &(m_0/\Delta, m_1/\Delta, \ldots, m_{N-1}/\Delta) \in \mathbb{R}^N \end{aligned} \quad \text{Rels. 6}$$

where $\lfloor \cdot \rceil$ means that each coefficient is rounded to the nearest integer. Notably, the foregoing encoding and decoding (i.e., Cf-$Ecd_\Delta$ and Cf-$Dcd_\Delta$) facilitates homomorphically computing polynomial addition and multiplication with N real numbers as coefficients, while conventional CKKS encoding discussed above performs vector addition and multiplication with N/2 complex numbers, resulting in only N/2 real numbers. Although two real numbers could be encoded into one complex number, such an encoding would not preserve component-wise multiplication.

Using the above convolutional encoding and decoding of Relations 6 (i.e., Cf-$Ecd_\Delta$ and Cf-$Dcd_\Delta$), a convolution or batched convolution, Conv(I,K), can be represented by a product of two plaintext polynomials in $\mathcal{R}$. For example, one or more input datasets of real numbers can be represented by a matrix I and a kernel or batch portion of a kernel used for performing a convolution by server 112 can be represented by a kernel matrix K. The one or more input datasets can be encoded as a plaintext polynomial expressed in terms of the variable X as:

$$I(X) = \sum_{0 \leq i,j < w} I_{i,j} \cdot X^{s((i-k)w+j)} \quad \text{Eq. 7}$$

with $I_{i,j}$ being an input value in the input matrix I at a row index of i and a column index of j, k being a total number of rows or columns in the kernel matrix K, w being a total number of rows or columns in the input matrix I, and s equal to 1 if the input matrix I represents a single input dataset or s being equal to or greater than a total number of input datasets if the input matrix I represents the batched input datasets. The plaintext polynomial I(X) is in the ring of polynomials expressed as $\mathcal{R}=\mathbb{Z}[X]/(X^N+1)$ with N being a power of two and $\mathbb{Z}[X]$ denoting integral coefficients of the polynomials in the ring.

The kernel polynomial can be expressed in terms of the variable X as:

$$K(X) = \sum_{0 \leq i,j < w} K_{i,j} \cdot X^{s(wk-(iw+j))} \quad \text{Eq. 8}$$

with $K_{i,j}$ being a kernel value in the kernel matrix K at a row index of i and a column index of j. As with the plaintext polynomial I(X), the kernel polynomial K(X) is in the ring of polynomials of $\mathcal{R}=\mathbb{Z}[X]/(X^N+1)$ with N being a power of two and $\mathbb{Z}[X]$ denoting integral coefficients of the polynomials in the ring. In simplifying the product of the plaintext polynomial I(X), or its encrypted counterpart $\hat{I}(X)$, and the kernel polynomial K(X), $X^t=-X^{N+t}$ if t<0 with $N \geq \max(sw^2, sk^2)$.

In this way, the size of the input matrix I and the size of the kernel matrix K do not exceed the degree bound or highest degree of the variable X of the product of the input polynomial and the kernel polynomial and can be simplified into a simplified polynomial where at least a plurality of the coefficients of the simplified polynomial forms an output of the convolution between the input matrix I and the kernel matrix K. As discussed in more detail below, the foregoing encoding of the one or more input datasets and of the kernel can enable a single multiplication to provide a convolution result on the one or more input datasets using the kernel or batch portions thereof. In contrast, convolutions using other forms of encoding typically involve many more arithmetic operations for a given input size and kernel size.

As shown in the example dataflow of FIG. 2, computing module 18 of server 112 multiplies an encrypted input polynomial $\hat{I}(X)$ with a kernel polynomial K(X) representing a kernel or a batch portion of a kernel to derive a simplified convolved polynomial $\hat{C}(X)$ resulting from the multiplication. At least a plurality of the coefficients in the convolved polynomial forms an encrypted output of the convolution. As discussed in more detail below, in cases where there are one or more input datasets encoded into the input polynomial, computing module 18 can separately multiply the input polynomial with a different batch kernel polynomial to result in corresponding batch convolved polynomials that are then used to determine an output ciphertext that represents an output of the convolution on the input ciphertext using the kernel.

Figures 3, 4:
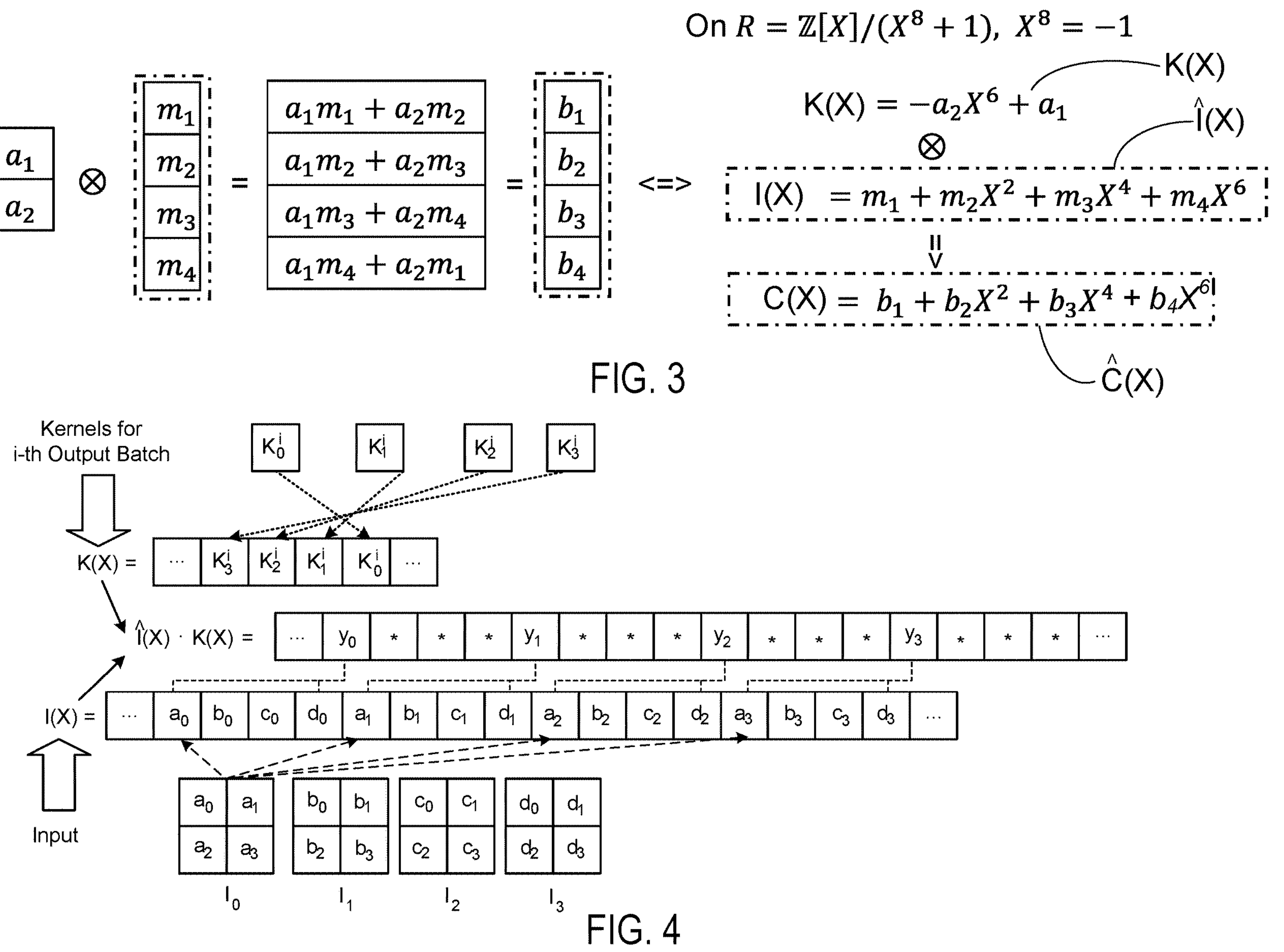
FIG. 3 illustrates an example of a convolution performed on a ciphertext according to one or more embodiments.
FIG. 4 illustrates the packing of an input ciphertext into a polynomial for performing a batched convolution according to one or more embodiments.

FIG. 3 illustrates an example of a one dimensional convolution performed on an input ciphertext $\hat{I}(X)$ according to one or more embodiments. As shown in FIG. 3, a kernel including kernel values $a_1$ and $a_2$ (e.g., weights) is multiplied with an input dataset including real values $m_1$, $m_2$, $m_3$, and $m_4$. The dot-dash boxes shown in FIG. 3 indicate values that have been encrypted according to an FHE scheme. The resulting product is simplified to an output including output values $b_1$, $b_2$, $b_3$, and $b_4$.

Coding module 10 of client device 102 encodes the input dataset into a plaintext polynomial expressed in terms of the variable X as $I(X)=m_1+m_2X^2+m_3X^4+m_4X^6$. As shown in FIG. 3, the plaintext polynomial is encrypted into the input polynomial or input ciphertext $\hat{I}(X)$ with the values $m_1$, $m_2$, $m_3$, and $m_4$ having been encoded as coefficients of the terms in the input polynomial. In this regard, mi has been encoded as a coefficient of the variable X to the zero degree, $m_2$ has been encoded as a coefficient of the variable X to the second degree, $m_3$ has been encoded as a coefficient of the variable X to the fourth degree, and $m_4$ has been encoded as a coefficient of the variable X to the sixth degree.

With reference to the example of FIG. 3, the kernel can be encoded by coding module 16 of server 112 into a kernel polynomial expressed in terms of the variable X as $K(X)=-a_2X^6+a_1$. The input polynomial (i.e., the input ciphertext in this case) and the kernel polynomial (i.e., the encoded kernel) are then multiplied together to provide an encrypted convolved polynomial or output ciphertext $\hat{C}(X)$ that can be simplified by setting $X^t=-X^{N+t}$ if $t<0$ with $N\geq\max(w^2, k^2)$ as noted above for Equations 7 and 8 with s=1, where k is a total number of rows in the kernel matrix (i.e., 2 rows) and w being a total number of rows in the input dataset (i.e., 4 rows). Simplifying the product results in a convolved polynomial with a plaintext form of $C(X)=b_1+b_2X^2+b_3X^4+b_3X^4+b_4X^6$ with the coefficients of the terms of the simplified polynomial forming an encrypted output of the convolution of the ciphertext input and the kernel (i.e., the encrypted versions of $b_1$, $b_2$, $b_3$, and $b_4$).

The foregoing encoding and convolution performed with polynomial multiplication provides significant improvements in evaluating convolutions on data that has been encrypted using FHE in terms of computational complexity and processing time. These improvements are especially apparent as the size of the kernel (e.g., depth and width) and the size of the input increase since the number of multiplications can be significantly reduced as compared to performing convolutions with FHE using previous encoding algorithms and ciphertext arithmetic operations.

Returning to the example of FIG. 2, the output ciphertext $\hat{C}(X)$ is provided from computing module 18 to activation module 24, which performs a modified bootstrapping on the output ciphertext. In some implementations, activation module 24 may also use an evaluation key $K_{eval}$ according to the FHE scheme in performing the modified bootstrapping. As discussed in more detail below with reference to FIG. 5, the modified bootstrapping can be performed in evaluating a convolutional layer of a CNN and includes performing an activation function, such as a Rectified Linear Unit (ReLU) function, a sigmoid function, a hyperbolic tangent function (tanh function), or a softmax function. In addition to performing the activation function, the modified bootstrapping also removes noise or error that has been added due to the multiplication of the polynomials with the FHE scheme by providing a refreshed ciphertext with a greater level L.

In more detail, the modified bootstrapping in some implementations includes converting the coefficients from the output ciphertext into a plurality of slots of an input vector according to the FHE scheme and performing a modular reduction approximated by a scaled sine function on each slot of the plurality of slots to generate reduced slots. An activation function (e.g., a ReLU function) is evaluated for the reduced slots to generate an output vector and values are extracted from the output vector based on a stride for the convolutional layer. The extracted values are then used to determine coefficients of an encrypted result polynomial $\hat{R}(X)$, which remains encrypted according to the FHE scheme. In this regard, the convolutional encoding and FHE encryption disclosed herein does not require decryption after performing the convolution to evaluate the activation function, which enables server 112 to evaluate a convolutional layer without additional communication with client device 102.

As shown by the dashed line returning to computing module 18 in FIG. 2, the result polynomial $\hat{R}(X)$ can be used as a new input polynomial for a next convolutional layer of the CNN that multiplies the new input polynomial (i.e., the result polynomial $\hat{R}(X)$ from the previous convolutional layer) and a new kernel polynomial including kernel values for the next convolutional layer. In cases where the convolutional layer generating the result polynomial $\hat{R}(X)$ was the last convolutional layer of the CNN or where there may have only been one convolutional layer for server 112 to evaluate, such as where different servers are used to evaluated different convolutional layers, the result polynomial $\hat{R}(X)$ or the coefficients of the result polynomial $\hat{R}(X)$ can be sent to client device 102.

The client device 102 then decrypts the result polynomial using FHE module 12 and secret key $K_s$ according to the FHE scheme. The decrypted result polynomial R(X) is then decoded by coding module 10 to determine one or more results R for a CNN using coefficients from the decrypted polynomial, such as by following the $\text{Cf-Dcd}_\Delta$ portion of Relations 6 above. In some cases, the results may be for a single input dataset. In other cases, such as where the input polynomial represents a batched input of multiple input datasets, the coefficients of the decrypted polynomial can be decoded to provide corresponding CNN results for the different input datasets.

Those of ordinary skill in the art will appreciate with reference to the present disclosure that other implementations of the dataflow of FIG. 2 may differ. For example, coding module 16 of server 112 is shown as a dashed line to indicate that other implementations may instead provide an already encoded kernel polynomial K(X) to server 112, rather than server 112 performing the encoding of the kernel polynomial. As another example variation, some implementations may instead provide the result polynomial $\hat{R}(X)$ to another server responsible for evaluating a next convolutional layer of the CNN. As yet another example variation, server 112 in some implementations may instead provide the output ciphertext $\hat{C}(X)$ to another server that is responsible for performing the modified bootstrapping including the activation function.

FIG. 4 illustrates the packing of input datasets into a plaintext polynomial I(X) for performing a batched convolution according to one or more embodiments. As shown in FIG. 4, the input includes four input datasets, each with a size of w=2 rows, and the kernel is partitioned into four portions, each with a size of k=1, that are packed into a kernel polynomial K(X).

The input datasets are packed into the plaintext polynomial I(X) represented in FIG. 4 with the coefficients of the input polynomial formed by the values from each of the input datasets after scaling and rounding as discussed above for the $\text{Cf-Ecd}_\Delta$ portion of Relations 6. The corresponding batches of kernel values are packed in FIG. 4 in a reverse order into a kernel polynomial K(X) after scaling and rounding as discussed above for the $\text{Cf-Ecd}_\Delta$ portion of Relations 6. The plaintext polynomial I(X) is then encrypted according to the FHE scheme to determine the input polynomial or input ciphertext $\hat{I}(X)$, before multiplying the input ciphertext and the kernel polynomial to perform a convolution on the input ciphertext. An encrypted output of the convolution between the input ciphertext and the kernel can then be determined from a simplified polynomial derived from the product of $\hat{I}(X)$ and K(X) (i.e., $\hat{I}(X)\cdot K(X)$ in FIG.

4). The coefficients of each of the plaintext polynomial I(X), the kernel polynomial K(X), and the convolved polynomial resulting from the product of the input polynomial and the kernel polynomial are shown in FIG. 4 from left to right in order of increasing degree of X.

Since batched convolution is a summation of single convolutions as shown by Equation 5 above, computing module 18 can use sparsely-packed input and kernel polynomials, which can be denoted as $I_{sp}(X)$ and $K_{sp}(X)$, so that convolutions between each batch are computed separately and then summed into one, which is represented in FIG. 4 with the asterisks in the product between $\hat{I}(X)$ and K(X).

The sparsely-packed polynomials can be formed as $I_{sp}(X)=I(X^s)$ and $K_{sp}(X)=K(X^s)$ using Equations 7 and 8 above for I(X) and K(X), respectively, for an input $I\in \mathbb{Z}^{w \times w}$ and a kernel $K\in \mathbb{Z}^{k \times k}$ and a positive integer s, with $N=\max(sw^2, sk^2)$. It follows then that the coefficient at a left to right position corresponding to a s(iw+j)-th position in I(X)·K(X) when written in increasing degree of X equals $Conv(I,K)_{i,j}$. In addition, the L-th coefficient of I(X)·K(X) is nonzero only if L is divisible by s (i.e., L=0 mod s). As used herein, such polynomials are referred to as "sparsely-packed" polynomials.

For a batch input $I^{(B)}\in \mathbb{Z}^{w \times w \times B}$ and kernels $K^{(B,B)}\in \mathbb{Z}^{k \times k \times B \times B}$ with $N\geq\max(w^2B, k^2B)$, and for batches b∈{0,1, . . . , B−1}, the encrypted output at a row i and column j for a convolution between $I^{(B)}$ and kernels $K^{(B,B')}$ for a given batch b is the coefficient at a left to right position corresponding to a B(iw+j)-th position in I(X)·K(X) when written in increasing degree of X $$\left(i.e., Conv\left(I^B, K^{(B,B')}\right)_{i,j}^b\right).$$

In other implementations, $w^2B$ and $k^2B$ may initially be smaller than N (i.e., $N<w^2B$ and $N<k^2B$), but in such implementations, the number of batches B can be decreased by setting a subset of the input datasets to be encoded into a plaintext polynomial to effectively lower B so that $N\geq\max(w^2B, k^2B)$ for the new smaller number for B. In such implementations, the other input datasets that were not encoded into the first plaintext polynomial could then be encoded into one or more additional plaintext polynomials for encryption and performance of the convolution for the remaining input datasets.

Algorithm 1 provided below (as pseudocode) can be used in some implementations by the server to perform a batched convolution.

Alg. 1

Input:
- input $I^{(B)} = (I^0, I^1, \ldots, I^{B-1}) \in \mathbb{Z}^{w \times w \times B}$
- kernel $K^{(B,B)} = (K^{(i,j)})_{0\leq i,j<B} \in \mathbb{Z}^{k \times k \times B \times B}$
- out batch index $0 \leq b < B$ Output:
$C_b(X) \in \mathcal{R}$ having $Conv(I^{(B)}, K^{(B,B)})^b$ as coefficients
Procedure:*(All polynomials and operations are in $\mathcal{R}$)
Set s ← B
for i = 0 to B − 1 do
  $I_s(X) \leftarrow \Sigma_{0\leq i,j<w} I_{i,j} \cdot X^{s((i-k)w+j)}$, $K_s(X) \leftarrow \Sigma_{0\leq i,j<w} K_{i,j} \cdot X^{s(wk-(iw+j))}$
  $l_i(X) \leftarrow I_s(X) \cdot X^i$
  $K_j(X) \leftarrow K_s(X) \cdot X^{-i}$
end for -continued Alg. 1

$I(X) \leftarrow \sum_{i=0}^{B-1} I_i(X)$ $K(X) \leftarrow \sum_{i=0}^{B-1} K_i(X)$ Output $C_b(X) \leftarrow I(X) \cdot K(X)$ Note that the batched convolution of Algorithm 1 above outputs one output among B batches constituting the result $Conv(I^B, K^{(B,B)})$. The multiplication can be performed B times by computing module 18 in FIG. 2 for each batch b∈{0,1, . . . , B−1} to determine a final encrypted output ciphertext for the batched convolutions. However, the final output ciphertext is derived from B polynomials of $\mathcal{R} = \mathbb{Z}[X]/(X^N+1)$ that are separately contained in B ciphertexts. The desired coefficients from the B polynomials can be extracted and packed into one new output ciphertext polynomial that, in some implementations, is used in the modified bootstrapping for evaluating a convolutional layer of a CNN that includes evaluating an activation function for the final output ciphertext of the batched convolution, as discussed with reference to FIG. 5 below.

In more detail, the selection of coefficients from the B convolved polynomials (i.e., the B output ciphertexts) can be performed based on a scaled geometric sequence with a common ratio of two between each successive term in the geometric sequence. This is similar to a modified "PackLWE" algorithm used in the paper by Chen, H., Dai, W., Kim, M., and Song, Y., "Efficient Homomorphic Conversion Between (Ring) LWE Ciphertexts", in *International Conference on Applied Cryptography and Network Security,* 2021, pgs. 460-479, which is hereby incorporated by reference in its entirety. Algorithm 2 below for packing the new polynomial of the final output ciphertext differs from the PackLWE algorithm in the above-referenced paper by adding an initial log step s that corresponds to the log base two of the output batch numbers (i.e., $\log_2 B$) instead of setting $s=\log_2 N$ as in the PackLWE algorithm. In addition, the EvalAuto(•,k) function in the PackLWE algorithm is replaced by a $Rot(\bullet, \rho_5(k))$ function evaluated using an evaluation key $K_{eval}$ according to the FHE scheme.

Algorithm 2 provided below (as pseudocode) can be used in some implementations by the server to homomorphically pack the B convolved polynomials (i.e., Learning With Error (LWE) ciphertexts) into one final output ciphertext representing the result of the batched convolution.

Alg. 2

*([n] denotes the set {0, 1, . . . , n − 1})

*($\rho_5(k)$ denotes the discrete log of $k$ with base 5 in $\mathbb{Z}_{2N}^{x}$, i.e., the number such that $5^{\rho 5(k)} = k \bmod 2N$)

Input: ciphertexts $ct_i \in \mathcal{R}_q^2$ for $i \in [2^\ell]$, an initial log step $s \in \mathbb{Z}$ satisfying $s \geq \ell$
if $\ell = 0$ then
  return ct ← $ct_0$
else
  $ct_{even} \leftarrow$ PackLWEs($\{ct_2]_j\}_{j\in[2^{\ell-1}]}$)

-continued

| Alg. 2 |
|---|
| $ct_{odd} \leftarrow \text{PackLWEs}(\{ct_{2j+1}\}_{j\in[2^{\ell-1}]})$ |
| $ct \leftarrow (ct_{even} + X^{2^{s-\ell}} \cdot ct_{odd}) + \text{Rot}_{keval}(ct_{even} \cdot X^{2^{s-\ell}} \cdot ct_{odd},$ |
| $\rho5(N/2^{s-\ell} + 1)$ |
| return ct |
| end if |
| Output: ct |

Assuming that each ciphertext $ct_i (0 \le i < 2^{\ell})$ can be represented as a plaintext polynomial in the form:

$$C_i(X) = c_{i,0} + c_{i,1}X + \ldots + c_{i,N-1}X^{N-1} \in \mathcal{R},$$

$$\text{satisfying } c_{i,j \cdot 2^s} = \mu_{i+j \cdot 2^s} \text{ for } 0 \le j < N/2^s,$$

and letting $n=2^{\ell}$, the output ciphertext ct of Algorithm 2 above can then be represented as a plaintext polynomial in the form:

$$\mu(X) = n(\mu_0 + u_1 X + \ldots + \mu_{N-1}X^{N-1}) \in \mathcal{R}.$$

Algorithm 2 above collects the $j \cdot 2^s$-th coefficients from each convolved polynomial $C_i(X)$, which can be described as a geometric sequence scaled by j with a common ratio of two between each successive term in the geometric sequence.

The extraction and packing of the new convolved polynomial can be expressed with letting $\{ct_b\}_{0 \le b < B}$ be the ciphertexts that each derive from the coefficients of the plaintext polynomial resulting from $I(X) \cdot K(X)$. The new encoded or packed convolved polynomial can be represented as C(X) that has coefficients of X such that the (iB+b)-th coefficient of C(X) equals the i-th coefficient of $I(X) \cdot K(X)$ for a particular batch b. In other words, the coefficient corresponding to the (B(iw+j)+b)-th term of C(X) equals $$Conv(I^B, K^{(B,B)})^b_{i,j}.$$

This results from setting up the batched convolutions as described above so that each output is located in a B-strided position among the coefficients so that the extracted coefficients from each resulting convolved polynomial can be packed or encoded efficiently into the new convolved polynomial C(X).

The batched convolutions cost B multiplications and one multiplicative depth to calculate $\{r_b(X)\}_{0 \le b < B}$ (i.e., one multiplication for each $r_b(X)$). Packing the B ciphertexts into one convolved polynomial then costs 2(B−1) multiplications and B−1 rotations without consuming multiplicative depth. In more detail, $\text{Rot}_{keval}(ct, \rho5(N/2^{\ell}+1))$ preserves the i-th coefficient of the underlying plaintext polynomial if i is divisible by $2^{\ell+1}$ and changes only its sign if i is divisible by $2^{\ell}$ but not by $2^{\ell+1}$. This can be interpreted more naturally with automorphisms on $\mathcal{R}$ whose detail can be found in the paper by Chen et al. incorporated by reference above. Notably, the multiplication of $X^{N/2^{\ell}}$ does not consume multiplicative depth since it does not increase the scaling factor of the ciphertext.

The leading term n can be removed without additional cost by regarding the scaling factor Δ of the input or output ciphertexts, as described above with reference to Relations 6, to be nΔ so that the messages are scaled to 1/n or multiplied by $n^{-1}$. In addition, Algorithm 2 above can be further adapted for the batched convolutions disclosed herein by setting s such that $2^s \ge B$. When the input ciphertexts are sparsely-packed as discussed above, the initial log step can be set as $s+\log_2 B$ so as to sparsely-pack the resulting output ciphertext.

The overall computational cost of homomorphic convolution using the encoding and decoding disclosed herein is provided in Table 1 below as "ConvFHE" in comparison to previous methods proposed that use "Vector Enc." described in the paper by Juvekar, C., Vaikuntanathan, V., and Chandrakasan, A., "Gazelle: A Low Latency Framework for Secure Neural Network Inference", in 27th *USENIX Security Symposium* (*USENIX Security* 18), 2018, pgs. 1651-1669, and "Spectral Enc." described in the paper by Lou, Q., Lu, W., Hong, C., and Jiang, L., "Falcon: Fast Spectral Inference on Encrypted Data", in *Advances in Neural Information Processing Systems,* 2020, Vol. 33, pgs. 2,364-2374. The number of available message slots and the multiplicative depths are also shown in Table 1 below. The computational cost can be represented by counting the number of required multiplications and rotations required for a given number of batches B, the kernel size k, and the input size w.

TABLE 1

| Method | Multiplications | Rotations | Slots | Mult. Depth |
|---|---|---|---|---|
| Vector Enc. | $k^2B$ | $k^2 + B - 2$ | N/2 | 1 |
| Spectral Enc. | B + 2 | $B - 1 + 4\log_2 w$ | $N/2w^2$ | 3 |
| ConvFHE | 3B − 2 | B − 1 | N | 1 |

As shown in Table 1 above, the overall computational cost of using the ConvFHE encoding disclosed herein is less than the previously proposed Vector Encoding and Spectral Encoding when considering both the required multiplications and the rotations. In addition, there is no need for additional Discrete Fourier Transform (DFT) and Inverse DFT (IDFT) evaluation or decrypting the result after each convolution as with Spectral Encoding since the operations for ConvFHE are not transformed to a frequency domain and remain in a space domain (i.e., X). In addition, the multiplicative depth remains at a lower level of 1. The disclosed ConvFHE encoding also provides twice as many slots as Vector Encoding, which allows for twice as many elements to be packed into the input ciphertext. In the disclosed ConvFHE encoding, rotations are applied on the ciphertext at level 0 after multiplications are performed on an input ciphertext of level 1, so the computational cost is more affected by the multiplications. In contrast, rotations and multiplications for the Vector Encoding scheme are both on an input ciphertext of level 1. As a result, the cost of performing convolutions using the disclosed ConvFHE encoding scheme is approximately less by a factor of $$\frac{1}{k^2}.$$

The convolved polynomial C(X) has the same packing structure as the input polynomial I(X). As discussed in more detail below with reference to the modified bootstrapping of FIG. 5, the output from one convolutional layer can be used as an input into a next convolutional layer of a CNN.

In addition, the foregoing ConvFHE encoding can evaluate padded convolution by encoding the input appropriately with zeros. For example, for k-width kernels, $$\frac{k+1}{2}$$

rows and columns of zeros can be added to the input for "SAME" padding (i.e., so that the input size is the same as the output size when the stride is equal to one). For strided convolution, the desired output can be extracted after evaluating the convolution.

When the total size $Bw^2$ of the batched input is relatively small and is equal to $N/2^s$ for a positive integer s, the input can be packed even more sparsely using $I(X^{2^s})$ instead of I(X) in Equation 7 above. For example, client device 102 may determine that a total size of the input datasets is equal to N divided by $2^s$. In response, client device 102 may then advantageously increase the degrees of the terms of the encoded plaintext polynomial I(X) by a factor of $2^s$ to result in an even more sparsely-packed plaintext polynomial $I(X^{2^s})$. The convolved polynomials then become $C_b(X^{2^s})$ instead of $C_b(X)$. This not only reduces the number of rotations when packing selected coefficients from multiple convolved polynomials resulting from a batched convolution, but also significantly lowers the computational cost of performing the modified bootstrapping in evaluating a convolutional layer.

Figure 5:
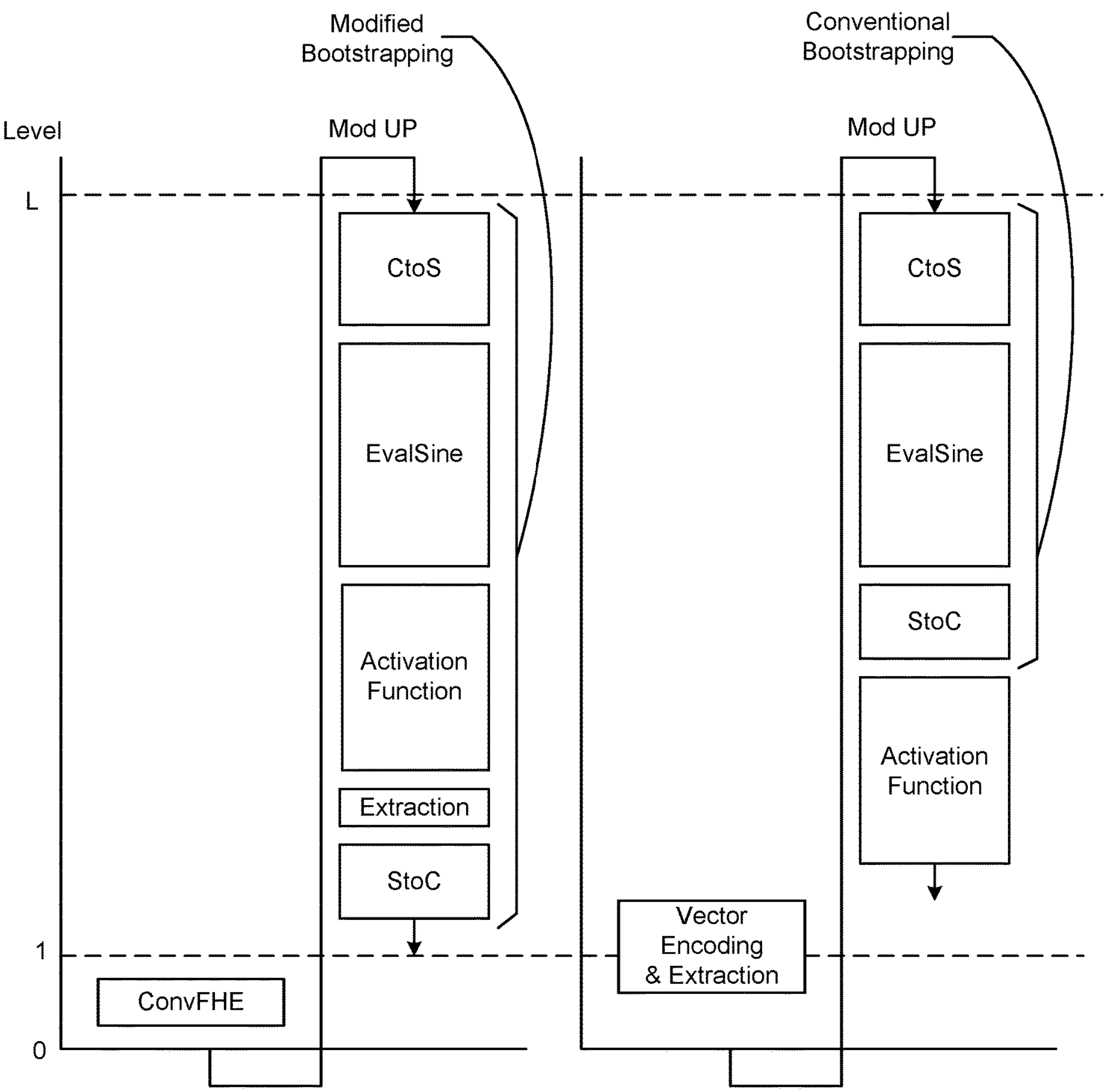
FIG. 5 illustrates a modified bootstrapping as compared to a conventional bootstrapping according to one or more embodiments.

FIG. 5 illustrates a modified bootstrapping as compared to a conventional bootstrapping according to one or more embodiments. As noted above, conventional bootstrapping has been introduced as a way of refreshing a ciphertext to allow for more multiplications to be performed when using FHE. In this regard, bootstrapping typically refreshes the ciphertext by increasing its level from 0 to a new level of L that is needed to perform L sequential homomorphic multiplications and still be able to accurately decrypt the result.

Unlike the vector encoding typically used with conventional bootstrapping, the polynomial coefficient encoding (i.e., ConvFHE) discussed above does not provide a format that is compatible with evaluating an activation function following a convolution. This problem is solved by using an intermediate state within bootstrapping when the output from the convolution is in a vector form to evaluate the activation function for a convolutional layer. In addition, any extraction needed for a stride of the convolutional layer can also be performed during this intermediate state of the output during bootstrapping. Specifically, the activation function and the extraction step in the modified bootstrapping disclosed herein is performed before the slot to coefficient step of bootstrapping, which also improves the efficiency of the bootstrapping as compared to conventional bootstrapping.

As shown in FIG. 5, the ConvFHE encoding on the left side of FIG. 5 first applies the convolution on the ciphertext input with level L=1, which results in an output ciphertext representing the result of the convolution with coefficients of a polynomial, as discussed above. A coefficient to slot operation (CtoS) is then performed as in the conventional bootstrapping shown on the right half of FIG. 5 when using vector encoding to convert the encrypted output or the coefficients from the convolved polynomial $\hat{C}(X)$ into a plurality of slots for a vector. As with conventional bootstrapping, a modular reduction is then performed that is approximated by a scaled sine function on each slot to generate reduced slots in the EvalSine step, which outputs a ciphertext similar to CKKS encoding that has polynomial coefficients encoded as a vector.

Unlike the conventional bootstrapping, an activation function is evaluated during an intermediate stage after the EvalSine step and before the CtoS stage. As noted above, the activation function can include, for example, a ReLU function, a sigmoid function, a tanh function, or a softmax function. This allows the modified bootstrapping to homomorphically evaluate an approximate polynomial of the activation function on the ciphertext since the inputs are encoded as a vector similar to CKKS encoding where the evaluation will be done component-wise. In the case of a ReLU function, a higher degree polynomial can also be used to approximate the ReLU function instead of a square function (i.e., $x^2$) typically used for approximating a ReLU function. This enables a more precise output for a deep CNN with higher accuracy.

As another difference from usual bootstrapping, valid values can be extracted in the Ext step from the output vector of the activation function to represent strided or non-strided convolutions before the slot to coefficient step (i.e., the StoC step in FIG. 5). The last step of the modified bootstrapping includes encoding the result from the extracted slots back into coefficients of a result polynomial in the StoC step so that the next convolution can be performed on the result polynomial for the next CNN layer or sent to the client device as a final encrypted result.

The modified bootstrapping disclosed herein is more efficient than conventional bootstrapping typically used with Vector Encoding because the final StoC step, which is more computationally costly than the EvalSine and activation function steps, is applied to ciphertext with a lower level L. In addition, and as noted above with reference to Table 1, the ciphertext using ConvFHE can pack twice as many real number messages than Vector Encoding. This improves the efficiency of the modified bootstrapping by enabling a larger number of input datasets to be used in a sparsely-packed polynomial where the size of the input is much less than the number of full message slots. The use of such sparsely-packed polynomials results in substantially less computational cost for the CtoS and StoC steps in bootstrapping. Processing times for different bootstrapping steps are discussed in more detail below with reference to FIG. 8 in comparing previous methods of vector encoding and conventional bootstrapping with the encoding and modified bootstrapping disclosed herein.

Figure 6:
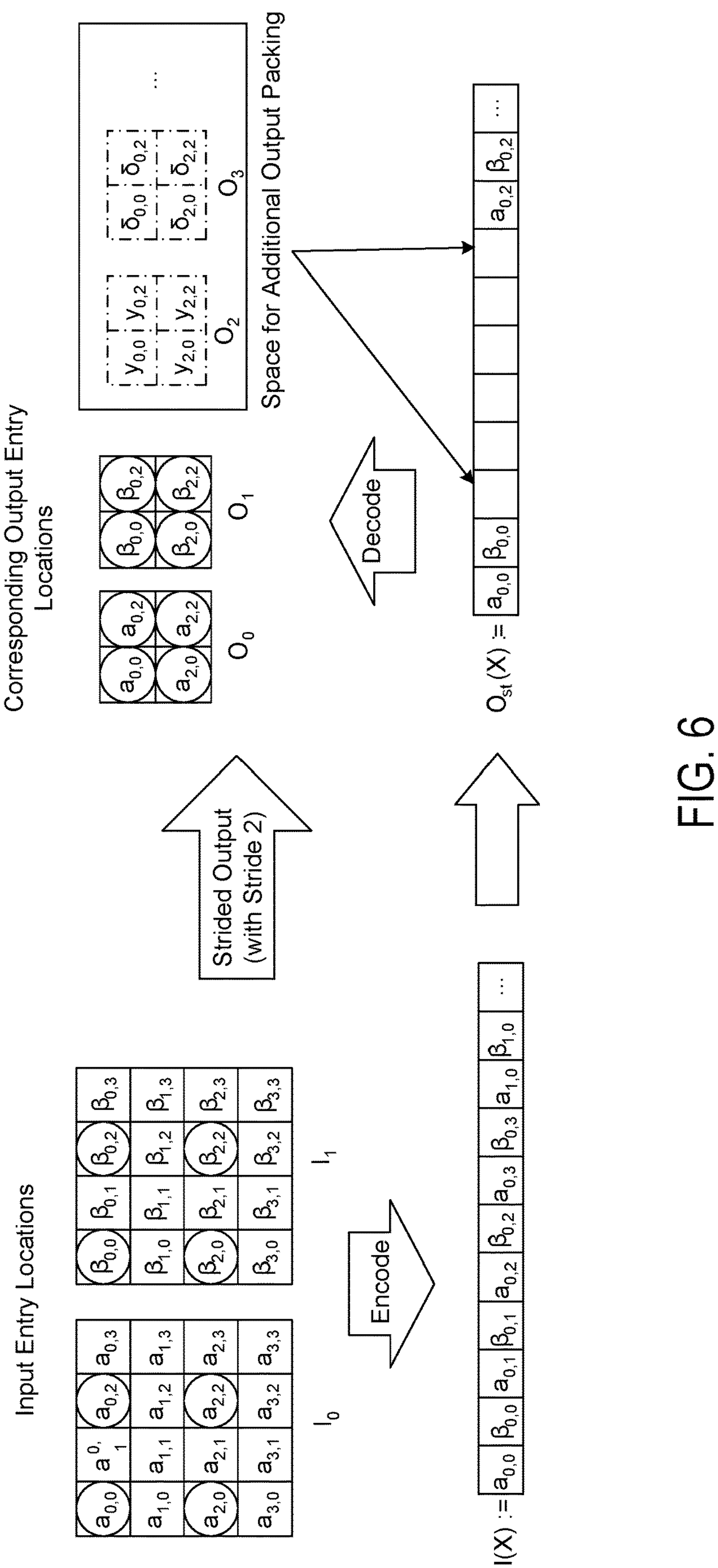
FIG. 6 illustrates extraction locations from a strided output polynomial according to one or more embodiments.

FIG. 6 illustrates extraction of an encrypted output from a strided output polynomial O(X) according to one or more embodiments. As noted above, the result polynomial R(X) of the disclosed homomorphic convolution and modified bootstrapping has the same packing structure as the input polynomial I(X). However, the output polynomial O(X) following the activation function includes invalid values even though the size of a convolution output is usually smaller than the input. As noted above, the extraction of valid values can be performed efficiently in the extraction step of the modified bootstrapping where the messages are temporarily encoded as a vector instead of as coefficients.

In some implementations, the extraction can be performed by multiplying a plaintext vector having 1 at valid positions and by 0 at all other positions in the vector. The extraction step is more complicated for strided convolutions though (i.e., convolutions with a stride greater than 1), since the packing structure of the output polynomial O(X) also needs modification. However, this extraction can still be performed more efficiently than with usual vector encoding where similar extraction is performed after the slot to coefficient step of bootstrapping.

A strided convolution can be represented by evaluating a convolution and then extracting appropriate entries from the strided output $O_{st}(X)$ according to the stride. The extracted output entries correspond to the circled input entry locations in FIG. 6. As discussed above with reference to FIG. 5, the extraction step in the modified bootstrapping occurs after evaluating the activation function and before converting the slots to coefficients (i.e., the StoC step in FIG. 5).

During the extraction, the valid output values are located in the slots of a plaintext polynomial. However, the order of the slots is bit-reversed from those of the coefficients due to the conversion of the coefficients to slots in the CtoS step. With reference to FIG. 6, the binary coordinates for an entry location in the input at coefficients of I(X) are $$(i, j, b) \in \mathbb{Z}_2^5 = \{0, 1\}^5$$

where i and j indicate the binary row and column coordinates, respectively, and b indicates the batch number. For example, the coordinates for the entry location $\beta_{1,2}$ in FIG. 6 are $$(i = (0, 1), j = (1, 0), (b = 1)) \in \mathbb{Z}_2^5$$

at the coefficients of I(X). During the extraction phase of the modified bootstrapping, these entries are moved to bit-reversed positions in the slots so that the binary coordinates for the $\beta_{1,2}$ entry become $$(b_{rev} = 1, j_{rev} = (0, 1), i_{rev} = (1, 0)) \in \mathbb{Z}_2^5.$$

In performing the extraction step, the valid entries are extracted from the slots taking into consideration the bit-reversed order. With reference to FIG. 6, we want to extract the entries of the output that correspond to the entry locations of the input that are located at columns and rows that are multiples of 2 since the stride in the example of FIG. 6 is 2. This can be expressed using the binary coordinates discussed above as the coefficient entries in O(X) with i=(i',0), j=(j',0), and b, which in turn corresponds to the bit-reversed slot entries of $b_{rev}$, $j_{rev}=(0,j'_{rev})$ and $i_{rev}=(0,i'_{rev})$. The strided output polynomial (i.e., $O_{st}(X)$ in FIG. 6) of valid entries will have coordinates of (i',j',(0,0, b)) for its coefficients, which corresponds to slot coordinates $(b_{rev},0,0)$, $j'_{rev}$, $i'_{rev}$. As shown in the example FIG. 6, the strided output polynomial also includes space now for additional batch outputs.

For the extraction in the modified bootstrapping, it then suffices to extract and move only the slot entries at $(b_{rev}, 0, j'_{rev}, 0, i'_{rev})$ to $(b_{rev}, 0, 0, j'_{rev}, i'_{rev})$, which can be performed by a multiply one-then-rotate operation according to the FHE scheme. In more detail, if w is the width of each input, then for each $$j'_{rev} \in \mathbb{Z}_2^{(log_2 w)-1},$$

each element or entry at $(b_{rev}, 0, j'_{rev}, 0, i'_{rev})$ can be moved to the left by $$\left(j'_{rev}, 0 \in \mathbb{Z}_2^{(log_2 w)-1}\right)$$

positions. This can be performed by (i) multiplying a plaintext vector having one at desired positions and 0 at other positions, as noted above, (ii) rotating the multiplied output corresponding to the required moves, and (iii) summing the outputs from each rotation. Notably, the total number of rotations and total number of multiplications for this extraction step is only w/2–1 and w/2, respectively, since the moves depend only on $$j'_{rev} \in \mathbb{Z}_2^{(log_2 w)-1}.$$

In comparison, the extraction step for the vector encoding discussed above with reference to FIG. 5 is significantly more computationally costly. For an input of width w, the number of kinds of moves required is $(w/2)^2$, since each extracted entry requires different moves, as opposed to moving each extracted entry to the left by $$\left(j'_{rev}, 0 \in \mathbb{Z}_2^{(log_2 w)-1}\right)$$

positions as discussed above for the extraction step of the modified bootstrapping. As a result, the extraction step when using conventional vector encoding requires a total number of $w^2/4–1$ rotations and $w^2/4$ multiplications if allowing only one multiplicative depth. This can be improved by using the Baby-Step Giant-Step (BSGS) algorithm leveraging greater multiplicative depth to represent the required moves into combinations of smaller moves. However, even with the BSGS algorithm, the vector encoding extraction step still results in at least w–2 rotations and w multiplications with multiplicative depth 2. The computational costs of vector encoding, vector encoding with BSGS, and the disclosed modified extraction step are compared below in Table 2 for a strided convolution with stride of two.

TABLE 2

| Extraction Method | Multiplications | Rotations | Mult. Depth |
|---|---|---|---|
| Vector Encoding without BSGS | $w^2/4$ | $w^2/4 - 1$ | 1 |
| Vector Encoding with BSGS | w | w − 2 | 2 |
| Modified Extraction | w/2 | w/2 − 1 | 1 |

Figure 7:
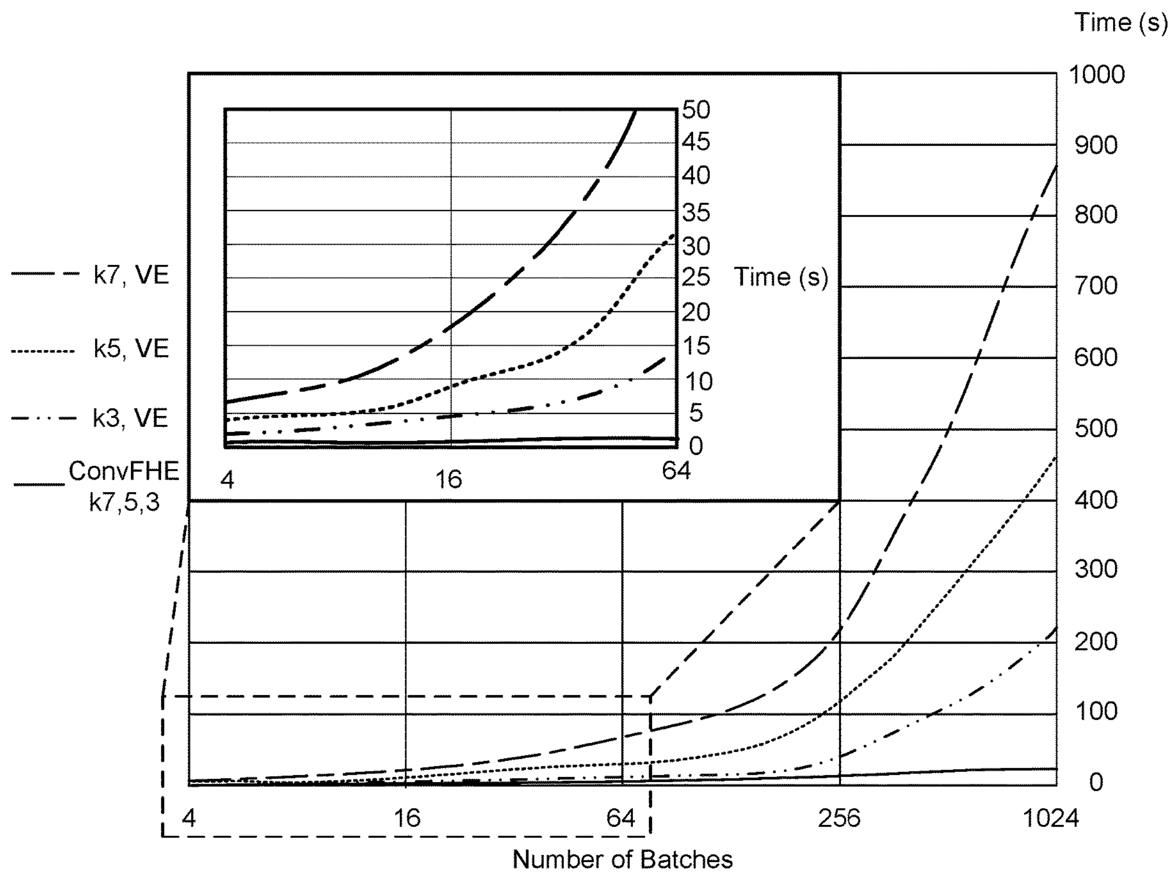
FIG. 7 depicts the time for performing batched convolutions with Fully Homomorphic Encryption (FHE) according to one or more embodiments.

FIG. 7 depicts the time for performing a batched convolution with FHE using the disclosed polynomial encoding and multiplication as compared to performing batched convolutions with FHE using conventional vector encoding. As shown in FIG. 7, conventional vector encoding for different kernel sizes of k=3, k=5, and k=5 have different times for performing the convolution, while the time for performing the batched convolutions using the encoding disclosed herein (i.e., ConvFHE in FIG. 7) does not vary based on the size of the kernel. This is in keeping with the computational cost shown in Table 1 above for ConvFHE, which does not depend on k, but rather, only depends on the number of batches, B.

As the number of batches increases along the x-axis of FIG. 7, the time for performing the convolution increases for both types of encoding, however, the time increases at a much higher rate when using conventional vector encoding as compared to the disclosed ConvFHE. In summary, using the disclosed ConvFHE encoding and convolution provides approximately 12 times, 31 times, and 59 times faster evaluation than conventional vector encoding when the kernel width is 3, 5, and 7, respectively.

Figure 8:
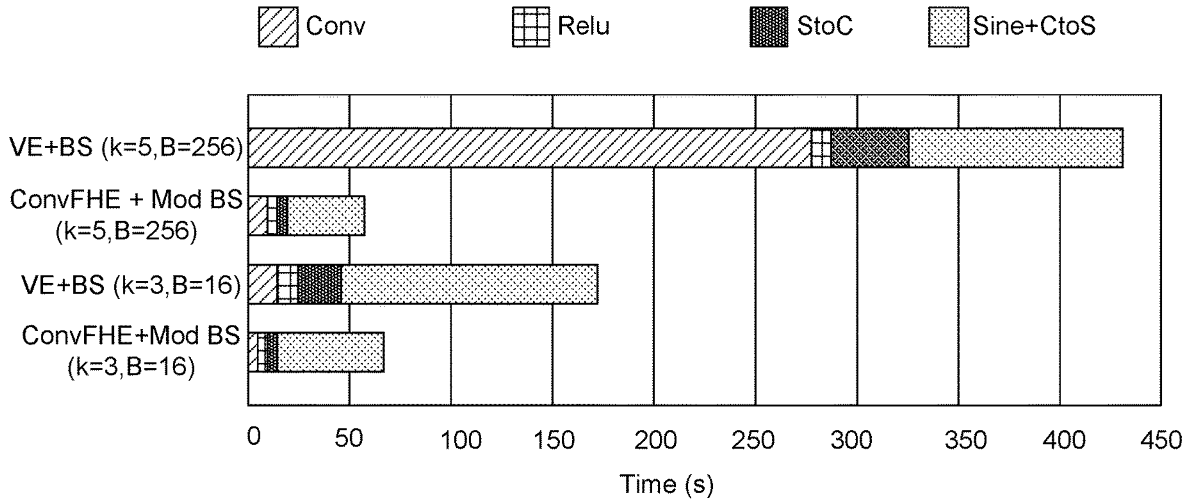
FIG. 8 depicts the time for evaluating a convolutional layer with FHE for different kernel sizes and corresponding input batch sizes according to one or more embodiments.

FIG. 8 depicts the time for evaluating a convolutional layer with FHE using the disclosed polynomial encoding and modified bootstrapping, as compared to evaluating a convolutional layer with FHE using conventional vector encoding and bootstrapping. The time for performing different stages in evaluating the convolutional layer is shown in FIG. 8 with "Conv" for the time to perform the convolution, "ReLU" for the time to perform the activation function (a ReLU function in this example), "StoC" for the time to perform the slot to coefficient conversion, and "Sine+CtoS" for the time to perform the modular reduction and coefficient to slot conversion.

In FIG. 8, a first example convolutional layer is evaluated using both systems for a kernel of width k=5 and B=256 batches. In addition, a second example convolutional layer is evaluated for FIG. 8 using both systems for a kernel of width k=3 and B=16 batches. Even with the smaller convolutional complexity of a kernel of k=3 and only 16 batches, the encoding and modified bootstrapping disclosed herein results in at least twice as fast of an overall evaluation time as compared to the conventional evaluation time. The improvement in evaluation time for the disclosed encoding and modified bootstrapping increases to being over five times faster when the kernel size increases to k=5 and the number of batches increases to 256.

Example Processes

Figure 9:
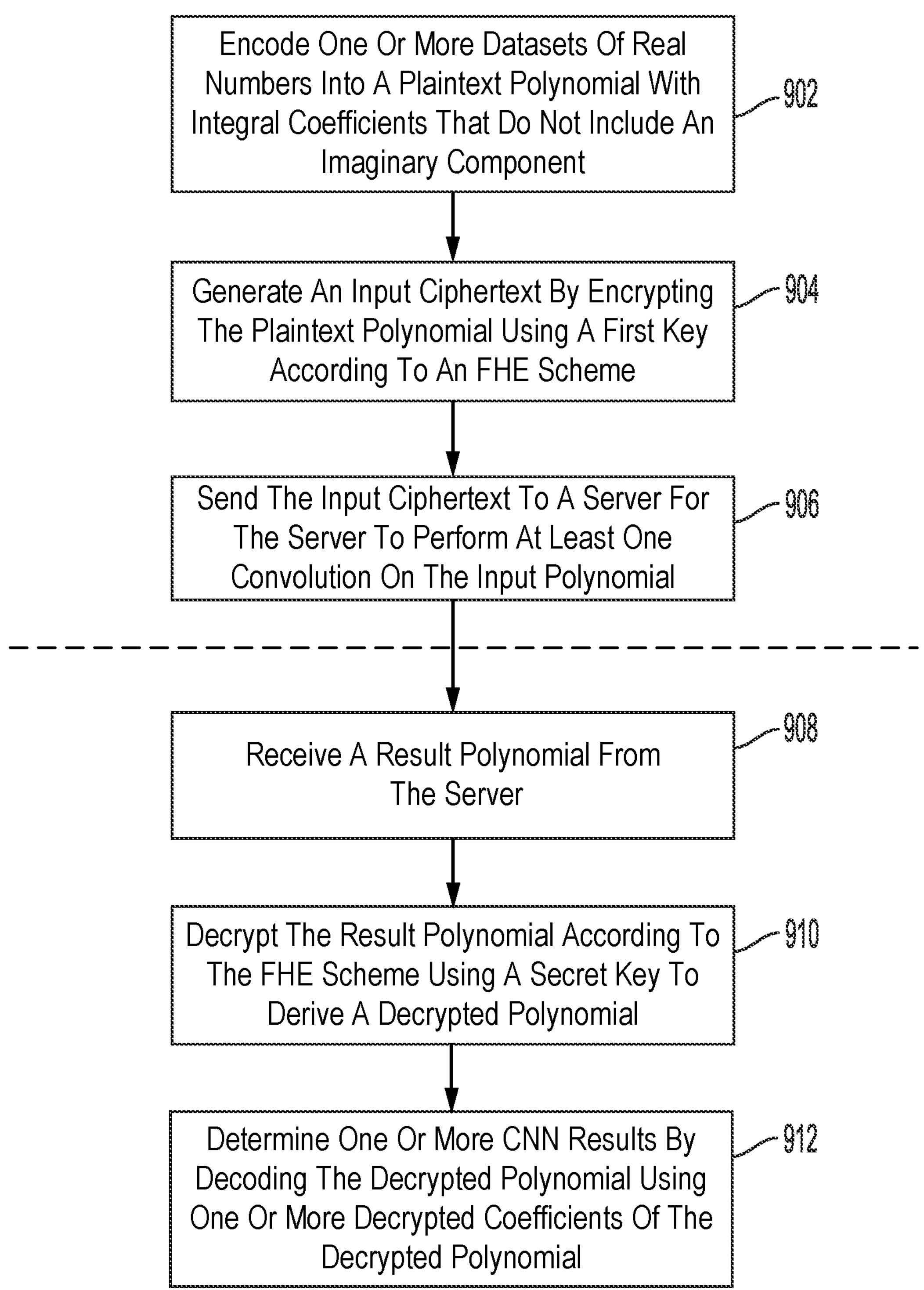
FIG. 9 is a flowchart for a client device process for generating an input ciphertext for a Convolutional Neural Network (CNN) and determining a CNN result from an encrypted result polynomial according to one or more embodiments.

FIG. 9 is a flowchart for a client device process for generating an input ciphertext for a CNN and determining a CNN result from an encrypted result polynomial according to one or more embodiments. The process of FIG. 9 can be performed by, for example, at least one processor 104 of client device 102 in FIG. 1 executing coding module 10 and FHE module 12. The process of FIG. 9 can be performed for a single convolutional layer or for multiple convolutional layers evaluated by a server in communication with the client device. The dashed line between blocks 906 and 908 in FIG. 9 indicates a break in the processing by the client device while the server evaluates the convolutional layer or layers.

In block 902, the client device encodes one or more input datasets of real numbers into a plaintext polynomial with integral coefficients that do not include an imaginary component. The input dataset or input datasets can include, for example, financial data, health data, or other private data that a client may want to have analyzed by a CNN. In encoding the one or more input datasets, the client device may follow the Cf-$Ecd_\Delta$ portion of Relations 6 above so as to encode an input dataset using Equation 7 or using a sparsely packed plaintext polynomial $I_{sp}(X)=I(X^s)$ or $I_{sp}(X)=I(X^{2^s})$ as discussed above to encode multiple input datasets into the plaintext polynomial. In this regard, the client device may evaluate a total size of the input datasets (e.g., $Bw^2$) in block 902 to determine whether the total size of the input datasets can equal N divided by $2^s$. In response to determining that the total size equals N divided by $2^s$, the client device can increase the degrees of the terms in the plaintext polynomial by a factor of $2^s$ to pack the input datasets even more sparsely into the plaintext polynomial.

In addition, the client device may determine in block 902 if the total size of a plurality of input datasets to be convolved is larger than a highest degree, N, of the input polynomial (e.g., $Bw^2>N$). If so, the client device can set a subset of the input datasets to be convolved as the one or more input datasets that are encoded into the plaintext polynomial and then use the remaining input datasets from the plurality of input datasets for one or more additional plaintext polynomials that are then used for additional convolutions. This selection of a subset of input datasets for encoding can effectively lower the value of B so that $Bw^2 \leq N$.

With reference to Relations 6 above, the input datasets can be represented by the real numbers $r_0, r_1, \ldots, r_{N-1}$. In addition, the input datasets can be organized to correspond to multiple dimensions of input data so as to represent matrices (e.g., 2D or 3D matrices), as is often the case with image data, for example. In such cases, a total row size or column size, such as w in Equation 7 above, may indicate a new row at every w+1-th value in the input dataset. An example implementation of the encoding in block 902 is discussed in more detail below with reference to the client device subprocess of FIG. 10 for encoding a dataset of real numbers into a plaintext polynomial.

In block 904, the client device generates an input ciphertext by encrypting the plaintext polynomial using a first key (e.g., a public key) according to an FHE scheme. In some implementations, this can be similar to the CKKS encryption discussed above, but with using a different plaintext polynomial due to the differences in encoding the plaintext polynomial with the format of the Cf-$Ecd_\Delta$ portion of Relations 6 above, as compared to encoding messages of complex numbers with $Ecd_\Delta$: $\mathbb{C}^{N/2} \to \mathcal{R}$ and $Dcd_\Delta$: $\mathcal{R} \to \mathbb{C}^{N/2}$ for the CKKS encoding discussed above. The resulting input ciphertext can include an encrypted input polynomial with encrypted coefficients. In some implementations, the input ciphertext may instead include only the encrypted coefficients with an indication of the degree of the term for the encrypted coefficient in the input polynomial, such as by occupying a particular position in the input ciphertext.

In block 906, the client device sends the input ciphertext generated in block 904 to a server to perform at least one convolution on the input polynomial formed by the encryption and encoding. In some implementations, one or more modules operating at the client device may communicate with one or more modules operating at the server to exchange information that may be encrypted about the operations to be performed. Such information can include, for example, a row size or a column size of a kernel used by the server (i.e., k) for performing a convolution on the input ciphertext, a total number of input datasets encoded into the input ciphertext that may be used by the server to encode a kernel, and/or evaluation keys or public keys that may be shared with the server by the client device as part of the FHE scheme. In this regard, the modules of the client device and of the server may form part of a distributed application for performing convolutions with encrypted data in some implementations.

In block 908, the client device receives an encrypted result polynomial from the server. The result polynomial can represent the result of the server's evaluation of one or more convolutional layers of a CNN based on using the input ciphertext received from the client device as an input to a first convolutional layer of the CNN. Notably, the input ciphertext and the data used during the evaluation of the one or more convolutional layers by the server remain encrypted with the FHE scheme. As indicated by the dashed line, there may be a break in the processing by the client device as the convolutional layer or layers are evaluated by the server. In some implementations, the client device may use this break to perform other tasks, such as encoding additional input datasets to be sent to the server as input ciphertexts to determine corresponding results from the CNN.

In block 910, the client device decrypts the result polynomial according to the FHE scheme using a secret key to derive a decrypted result polynomial. The decryption in some implementations can follow the CKKS decryption of an encrypted polynomial. The secret key, unlike the public key or the evaluation key or keys, is generally not shared with other devices so that only the client device can perform the final decryption to obtain the result or results from the evaluation of the convolutional layers.

In block 912, the client device determines one or more CNN results by decoding the decrypted polynomial. The client device can use one or more decrypted coefficients of the decrypted result polynomial as inputs into the Cf-$Dcd_\Delta$ portion of Relations 6 above with $m_0, m_1, \ldots, m_{N-1}$ being the decrypted coefficients. In cases where the input ciphertext may have represented a batched input with multiple input datasets encoded into the plaintext polynomial, the result polynomial may indicate multiple corresponding CNN results for the different input datasets.

Those or ordinary skill in the art will appreciate with reference to the present disclosure that other implementations of FIG. 9 may differ. For example, in some implementations there may be additional processing that may be performed by the client device, such as in preparing the input datasets for encoding or using the one or more CNN results to associate it with other data.

Figure 10:
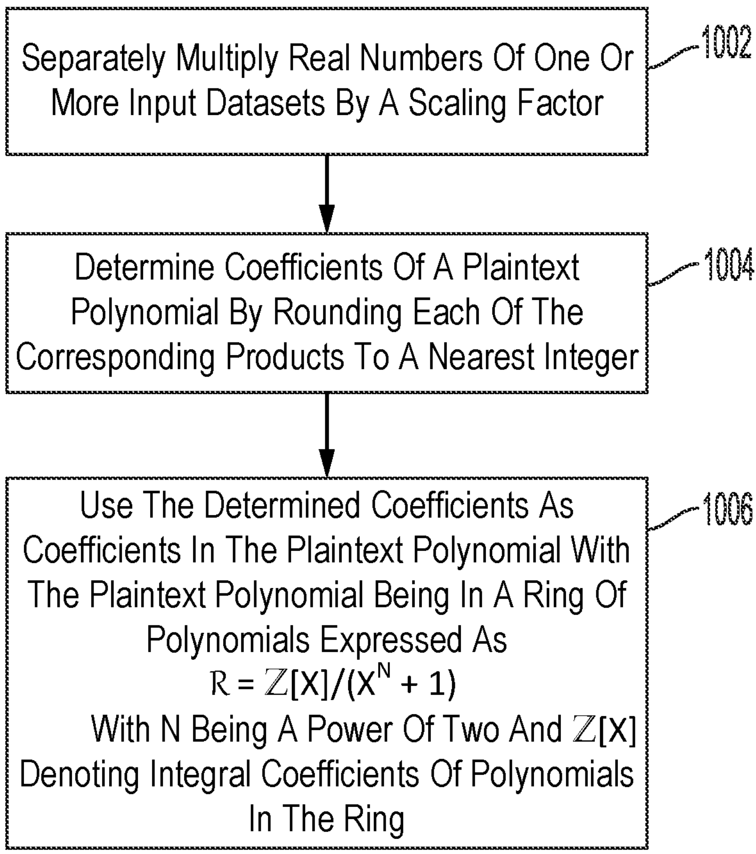
FIG. 10 is a flowchart for a client device subprocess for encoding a dataset of real numbers into a plaintext polynomial according to one or more embodiments.

FIG. 10 is a flowchart for a client device subprocess for encoding one or more datasets of real numbers into a plaintext polynomial according to one or more embodiments. The process of FIG. 10 can be performed by, for example, at least one processor 104 of client device 102 in FIG. 1 executing coding module 10. As noted above, the subprocess of FIG. 10 may be performed as part of an encoding process of the client device, such as a subprocess of block 902 of FIG. 9 discussed above.

In block 1002, real numbers from one or more input datasets are separately multiplied by a scaling factor. With reference to the Cf-$Ecd_\Delta$ portion of Relations 6 above, the scaling factor is represented by $\Delta$, which can control the precision of the arithmetic operations to be performed on the input ciphertext resulting from a later encryption of the plaintext polynomial. In some implementations, block 1002 may be omitted, such as where there is not a need for a scaling factor (e.g., $\Delta=1$).

With reference to Relations 6 above, the input datasets can be represented by the real numbers $r_0, r_1, \ldots, r_{N-1}$. In addition, the input datasets can be organized by the client device to reflect datasets of multiple dimensions (e.g., 2D or 3D data) where the order of the real numbers in a dataset can indicate different rows of values. For example, with reference to Equation 7 above, a w value of four can indicate that every fifth value in the input dataset is the beginning of a new row in a matrix represented by the input dataset.

In block 1004, the client device determines the coefficients of the plaintext polynomial by rounding, to the nearest integer, each of the corresponding products of the real numbers of the one or more input datasets and the scaling factor. This is indicated by the operators $\lfloor \cdot \rceil$ in Relations 6 above.

In block 1006, the client device uses the determined coefficients from block 1004 as coefficients in the plaintext polynomial. As discussed above, the plaintext polynomial is in the ring of polynomials defined by $\mathcal{R}=\mathbb{Z}[X]/(X^N+1)$ with N being a power of two and $\mathbb{Z}[X]$ indicating that the coefficients of the plaintext polynomial are integers. In addition, $X^N=-1$ for the polynomial in the ring, and as noted above when simplifying the product of the input polynomial and the kernel polynomial, $X^t=-X^{N+t}$ if $t<0$.

The plaintext polynomial can follow the format of I(X) in Equation 7 for encoding a single input dataset or can follow a sparsely-packed format for the plaintext polynomial as discussed above with $I_{sp}(X)=I(X^s)$ or $I_{sp}(X)=I(X^{2^s})$ to encode multiple input datasets into the plaintext polynomial. The foregoing encoding (i.e., Cf-$Ecd_\Delta$ and Equation 7) facilitates homomorphically computing polynomial addition and multiplication with N real numbers as coefficients, while conventional CKKS encoding performs vector addition and multiplication with N/2 complex numbers, resulting in encoding half as many real numbers (i.e., N/2).

Those of ordinary skill in the art will appreciate with reference to the present disclosure that other implementations of the encoding process of FIG. 10 may vary. For example, in other implementations the encoding process can include scaling or organizing data into the input datasets before block 1002 or can include packing additional input datasets as part of block 1006 in a particular order.

Figure 11:
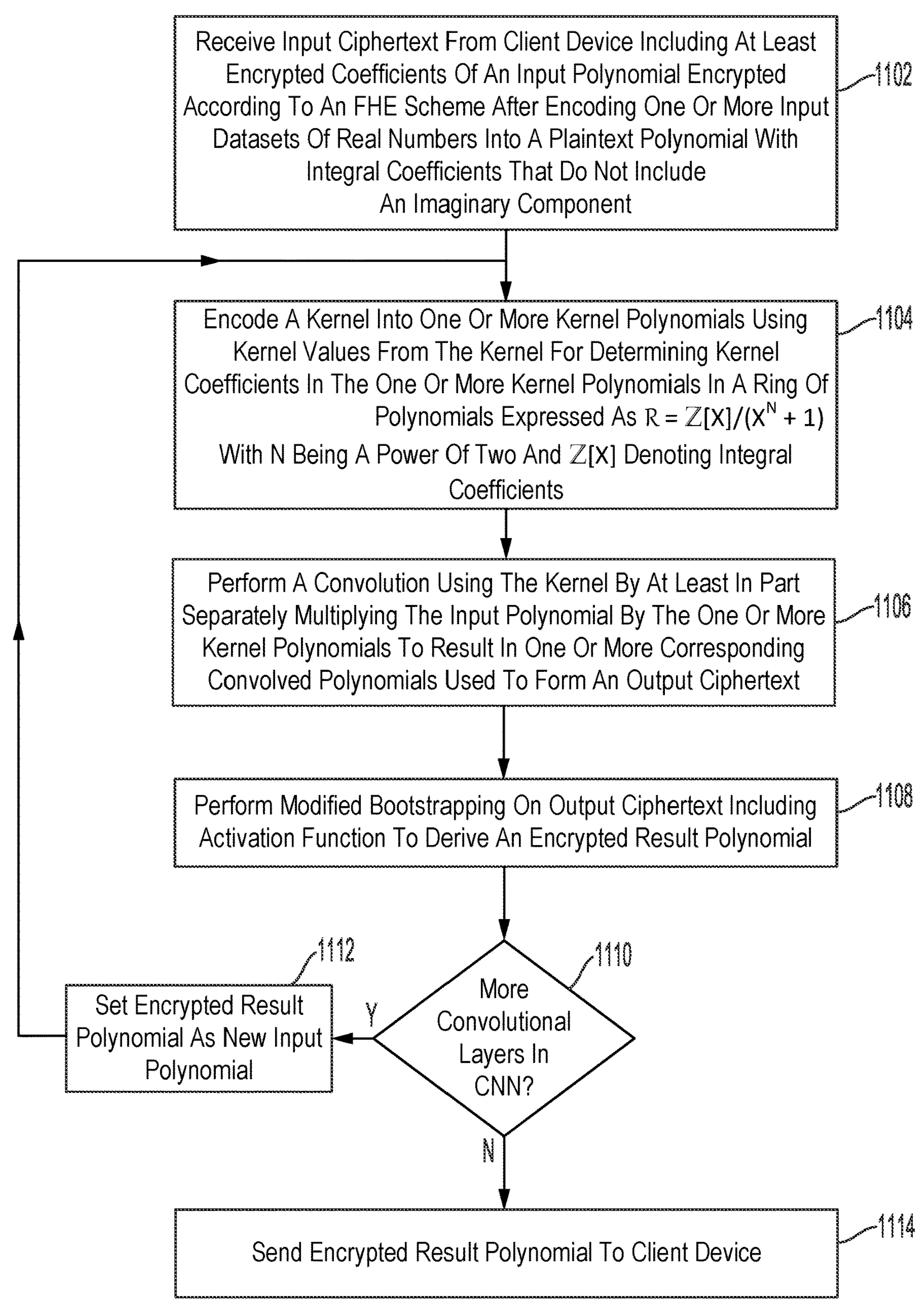
FIG. 11 is a flowchart for a server process for evaluating one or more convolutional layers of a CNN using encrypted data according to one or more embodiments.

FIG. 11 is a flowchart for a server process for evaluating one or more convolutional layers using encrypted data according to one or more embodiments. The process of FIG. 11 may be performed by, for example, at least one processor 114 of server 112 in FIG. 1 executing coding module 16, computing module 18, and activation module 24. The process of FIG. 10 can be performed for a single convolutional layer or for multiple convolutional layers based on an input ciphertext received from a client device.

In block 1102, the server receives an input ciphertext from the client device including at least the encrypted coefficients on an input polynomial encrypted according to an FHE scheme. The input ciphertext can include the variables (e.g., X) of each term of the input polynomial with the degrees of the variable (e.g., $X^6$). In some implementations, the input ciphertext may include only the encrypted coefficients with the degree of the variable being indicated by its position in the ciphertext or by another indicator for the term immediately following the encrypted coefficient.

As discussed above with reference to FIGS. 9 and 10, the input ciphertext can be, or at least represents, an input polynomial that results from encoding one or more input datasets of real numbers into a plaintext polynomial that is then encrypted according to the FHE scheme. The one or more input datasets are used to calculate integral coefficients of the plaintext polynomial, that unlike with conventional CKKS encoding, do not include an imaginary component (i.e., that are not complex numbers).

In block 1104, the server encodes a kernel into one or more kernel polynomials using kernel values from the kernel as kernel coefficients. This may be performed using a coding module of the server (e.g., coding module 16 in FIG. 1 of server 112). As noted above, some implementations may not require the server to encode the kernel and may instead receive an already encoded kernel polynomial from another device. In such cases, the encoded kernel polynomial may or may not be already encrypted by the FHE scheme. For example, in other implementations, the server may only provide a computing resource, rather than both the computing resource and the trained weights (i.e., the kernels) used in the CNN. In such examples, a third party providing a trained weighting for the CNN may send one or kernel polynomials that have been encrypted using a public key of the FHE scheme to the server. This can enable the third party provider of the trained weights for the CNN to keep its proprietary weightings private in a similar way to how the client device can keep its input data private by using the FHE scheme.

In the example of FIG. 11, the server can encode the kernel values of the kernel for a first convolutional layer directly into a kernel polynomial as discussed above with reference to Equation 8 to form one or more kernel polynomials K(X). In cases where multiple input datasets have been packed or encoded into the input polynomial I(X), the server can encode multiple kernel polynomials that will be separately multiplied with the input polynomial to determine corresponding output ciphertexts representing outputs of the convolutions for the different input datasets. As with encoding the input datasets into the plaintext polynomial discussed above, encoding the kernel polynomial K(X) or the kernel polynomials $K_{i,b}(X)$, can include rounding the kernel values from the kernel to a nearest integer and using them as coefficients in one or more kernel polynomials in the ring of polynomials expressed as $\mathcal{R}=\mathbb{Z}[X]/(X^N+1)$ with N being a power of two.

In block 1106, the server performs a convolution using the kernel by at least in part separately multiplying the input polynomial by the one or more kernel polynomials encoded in block 1104. The multiplication or multiplications result in one or more corresponding convolved polynomials that are used by the server to form an output ciphertext. As discussed in more detail below with reference to the modified bootstrapping process of FIG. 13, performing the convolution in this way facilitates a lower multiplicative depth of L=1 for the input ciphertext as compared to performing a convolution using a vector encoding where the number of multiplications is greater by a factor of the kernel size squared (i.e., $k^2$).

In the case of multiple input datasets being encoded into the plaintext polynomial and the separate multiplications of the input polynomial with respective kernel polynomials, the resulting convolved polynomials are distinct ciphertexts due to the FHE scheme that the server then needs to combine or pack into a single output ciphertext. As discussed above, Algorithm 2 can be used by the server to pack selected coefficients from the different convolved polynomials into a single convolved polynomial that serves as the output ciphertext representing the result of the convolution on the input ciphertext using the kernel. As noted above, the result of the homomorphic operations disclosed herein are approximations of the arithmetic operations being performed on the unencrypted counterparts (e.g., a convolution performed on the input dataset using the kernel). An example implementation of the packing of coefficients from the different convolved polynomials into an output ciphertext is discussed in more detail below with reference to the subprocess of FIG. 12.

In block 1108, the server performs a modified bootstrapping on the output ciphertext that includes evaluating an activation function to derive an encrypted result polynomial. As discussed above, a ciphertext of level L typically allows L sequential homomorphic multiplications to be performed on the ciphertext while still being able to accurately decrypt the result. A bootstrapping operation refreshes the ciphertext with a new ciphertext of a similar form that has a reset level of L to allow for more homomorphic multiplications.

Unlike conventional bootstrapping, the modified bootstrapping disclosed herein that can be performed by the activation module of the server includes the evaluation of an activation function and the possible extraction of values from an interim output vector based on a stride of the convolutional layer before converting values or slots from the output vector back into coefficients. Conventional bootstrapping does not include the evaluation of an activation function and such extraction based on the stride as part of the bootstrapping. Instead, these operations are typically performed after the completion of the bootstrapping. Modifying the bootstrapping this way not only facilitates the encoding disclosed herein, but is also more efficient as discussed above since the activation function is performed on a ciphertext with a lower level, which decreases the computational complexity of evaluating the activation function. More detail on the modified bootstrapping is provided below with reference to the subprocess of FIG. 13.

In block 1110 in FIG. 11, the server determines whether there are more convolutional layers to evaluate in the CNN after deriving the encrypted result polynomial in block 1108. If there are more convolutional layers to evaluate, the server in block 1112 sets the encrypted result polynomial as a new input polynomial for evaluating the next convolutional layer. The process of FIG. 11 then returns back to block 1104 to encode a kernel for the next convolutional layer or proceeds to block 1106 to perform a convolution if the kernel is already encoded into one or more kernel polynomials for the next convolutional layer.

On the other hand, if there are not more convolutional layers to evaluate for the CNN in block 1110, the process of FIG. 11 proceeds to block 1114 to send the encrypted result polynomial to the client device. In this regard, the result polynomial, the input ciphertext, the output ciphertext, and any intermediate convolved polynomials or output polynomials from the convolution and the modified bootstrapping remain encrypted throughout the evaluation by the server of the one or more convolutional layers of the CNN.

Those of ordinary skill in the art will appreciate with reference to the present disclosure that other implementations can include a different order of blocks or different blocks than shown in FIG. 11. For example, in some implementations, the server may not need to encode the kernel into one or more kernel polynomials if another device has already performed this encoding. As another example variation, the server may be used to perform operations for additional non-convolutional layers of the CNN, such as a pooling layer after performing the modified bootstrapping.

Figure 12:
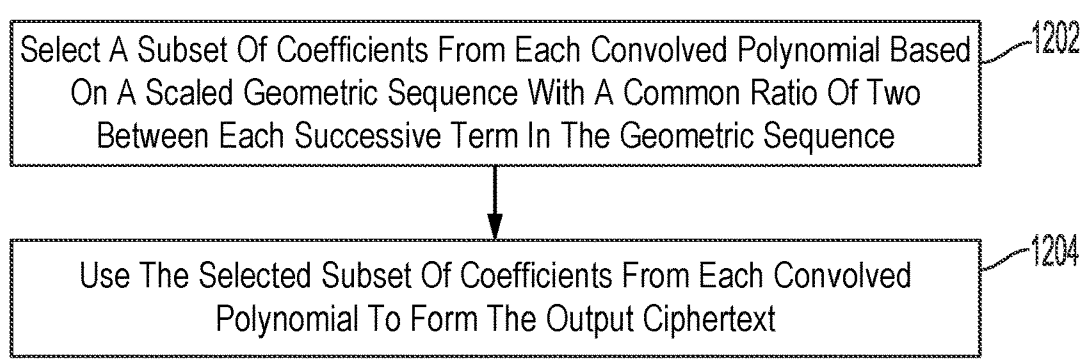
FIG. 12 is a flowchart for a server subprocess for determining an output ciphertext for a batched convolution according to one or more embodiments.

FIG. 12 is a flowchart for a server subprocess for determining an output ciphertext for a batched convolution according to one or more embodiments. The subprocess of FIG. 12 may be performed by, for example, the at least one processor of the server as part of block 1106 in FIG. 11 to pack different convolved polynomials for different input datasets into one new output ciphertext before performing the modified bootstrapping on the output ciphertext. This packing operation is generally needed due to each convolved polynomial being a different ciphertext in the FHE scheme.

In block 1202, the server selects a subset of coefficients from each convolved polynomial based on a scaled geometric sequence with a common ratio of two between each successive term in the geometric sequence. In other words, the selection can be the $j \cdot 2^s$-th coefficients from each convolved polynomial, where s is an integer initial log step that is greater to or equal to one and corresponds to the log base two of the number of convolved polynomials (e.g., $s=\lfloor \log_2 B \rceil$). In some implementations, this can include performing Algorithm 2 above, which uses n−1 rotations and 2(n−1) plaintext multiplications without consuming any multiplicative depth in terms of the level of the ciphertexts, L, where n is the total number of convolved polynomials. In performing the rotations, the server can use an evaluation key as part of the FHE scheme that may be stored at the server as part of keys 20 in FIG. 1.

In some implementations, the initial log step can be set to $s+\log_2 B$ when the input polynomial has been packed even more sparsely with $I(X^{2^s})$ as discussed above for when a total size of the input $Bw^2$ is relatively small and equal to $N/2^s$, with N being the highest degree of the input polynomial. This results in the output ciphertext being sparsely-packed as well, which reduces the number of rotations in the subsequent modified bootstrapping.

In block 1204, the selected subset of coefficients from the convolved polynomials are used by the server to form the output ciphertext representing the output of the convolution of an input ciphertext and a kernel. The output ciphertext can have the form of $\mu(X)=n(\mu_0+\mu_1 X+ \ldots +\mu_{N-1}X^{N-1})\in\mathcal{R}$, where $\mathcal{R}$ denotes the ring of polynomials discussed above for the input and kernel polynomials. The output ciphertext may then be used as an input to a modified bootstrapping process that includes evaluating an activation function for a convolutional layer.

Figure 13:
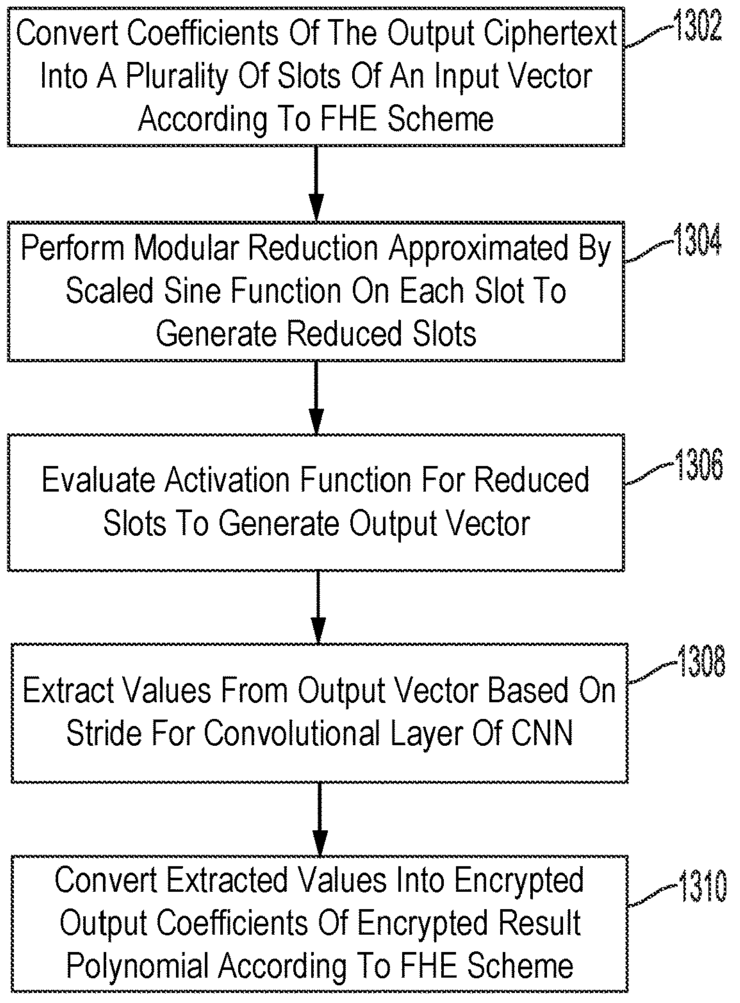
FIG. 13 is a flowchart for a modified bootstrapping subprocess in evaluating a convolutional layer according to one or more embodiments.

In this regard, FIG. 13 is a flowchart for a modified bootstrapping subprocess in evaluating a convolutional layer according to one or more embodiments. The subprocess of FIG. 13 may be performed by, for example, the at least one processor of the server as part of block 1108 in FIG. 11 to refresh the ciphertext and to evaluate the activation function with a possible extraction of coefficients based on a stride before completing the modified bootstrapping.

In block 1302, the server converts coefficients of an output ciphertext into a plurality of slots of an input vector according to the FHE scheme. This corresponds to the CtoS step of the modified bootstrapping of FIG. 5. The output ciphertext can represent the output of a convolution, such as the output ciphertext discussed above for block 1106 in FIG. 11 or the output ciphertext discussed above for block 1204 in FIG. 12. The conversion of the coefficients may be similar to a CKKS encoding of coefficients into a vector.

In block 1304, the server performs a modular reduction that is approximated by applying a scaled sine function on each slot of the input vector to generate reduced slots. Block 1304 and block 1302 may be similar to conventional bootstrapping where an encoding algorithm is homomorphically applied to enable a parallel or slot-wise evaluation. However, unlike conventional bootstrapping, the subprocess of FIG. 13 takes advantages of the temporary conversion of a ciphertext into a vector form for slot-wise evaluation of an activation function. For example, when the activation function for the convolutional layer is a ReLU function, the interim encoding as a vector can enable a more efficient evaluation of the activation function as compared to an encoding as coefficients of a polynomial since the ReLU function is better suited to a slot-wise evaluation with $\mathrm{ReLU}(m_1, m_2, \ldots, m_n)=\mathrm{ReLU}(m_1), \ldots, \mathrm{ReLU}(m_n)$.

In block 1306, the server evaluates an activation function for the reduced slots in the input vector to generate an output vector. As discussed above, the activation function can include, for example, a ReLU function, a sigmoid function, a tanh function, or a softmax function. As appreciated by those of ordinary skill in the art, the activation function can be performed on the output of a convolution to transform a weighted sum resulting from the convolution into a result or output for a convolutional layer of a CNN. By performing the activation function on the reduced slots of the input vector, the operations of the activation function are typically simplified as compared to performing the activation function on the coefficients of a polynomial. In the case of a ReLU function, a higher degree polynomial can also be used to approximate the ReLU function than the square function (i.e., $x^2$) typically used for approximating a ReLU function. This enables a more precise output for a deep CNN with higher accuracy.

In block 1308, the server extracts values from the output vector resulting from the evaluation of the activation function for the slots of the input vector in block 1306. As discussed above with reference to the modified bootstrapping of FIG. 5, valid values are extracted from the output vector based on a stride for the convolutional layer. In cases where the stride is one, block 1308 may be omitted. As with the performance of the activation function, the extraction of valid values based on the stride is simplified when the output from the convolution is in a vector form as compared to the polynomial form used in performing the convolution.

In block 1310, the server converts the extracted valid values from block 1308 into encrypted output coefficients of an encrypted result polynomial according to the FHE scheme. As compared to conventional bootstrapping, performing the activation function and the extraction steps before performing the conversion of the slots to coefficients (i.e., the StoC step) improves the overall efficiency of the bootstrapping process by performing the more computationally complex operations of the StoC step at a lower level of the ciphertext. The StoC step, which can be similar to a CKKS decoding, results in an encrypted result polynomial according to FHE scheme. The encrypted result polynomial may then be used as an input polynomial for a next convolutional layer or may be sent to the client device as an encrypted result of the CNN if the activation function was performed for a final convolutional layer of the CNN.

Those of ordinary skill in the art will appreciate with reference to the present disclosure that other implementations of the modified bootstrapping subprocess of FIG. 13 may differ. For example, the extraction of values from the output vector in block 1308 may be omitted for convolutional layers with a stride of one. As another example variation, the server that performed the convolution may be different from the server that performs the modified bootstrapping to improve a throughput of multiple input polynomials through a convolutional layer of the CNN.

The foregoing systems and methods for evaluating convolutional layers using encrypted data can significantly improve the processing time of evaluating convolutional layers with FHE, as demonstrated by FIGS. 7 and 8 discussed above. In this regard, the ConvFHE encoding disclosed herein can allow for twice as many input datasets to be encoded into an input ciphertext and can significantly reduce the computational complexity of performing a convolution with encrypted data by multiplying an input polynomial and one or more kernel polynomials. This is shown in Table 1 above with the lower number of multiplications and rotations needed for ConvFHE encoding. By consuming only one level of multiplicative depth with the convolution, the present disclosure can also facilitate the use of deeper CNNs with FHE. In addition, the modified bootstrapping disclosed herein also provides improvements in performance, as shown by the reduction in time to perform the StoC step and Sine+CtoS steps in FIG. 8.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A server, comprising:

an interface configured to communicate with a client device; and at least one processor, individually or in combination, configured to:

receive an input ciphertext from the client device including at least encrypted coefficients of an input polynomial, wherein the encrypted coefficients have been encrypted according to a Fully Homomorphic Encryption (FHE) scheme after encoding one or more input datasets of real numbers into a plaintext polynomial with integral coefficients;

perform a convolution on the input ciphertext using a kernel by at least in part separately multiplying the input polynomial by one or more kernel polynomials to result in one or more corresponding convolved polynomials, wherein the one or more kernel polynomials include kernel coefficients encoded using kernel values for the kernel;

use at least a plurality of coefficients in each of the one or more convolved polynomials to derive an output ciphertext representing an output of the convolution on the input ciphertext using the kernel; and perform a modified bootstrapping on the output ciphertext, wherein in performing the modified bootstrapping, the at least one processor, individually or in combination, is further configured to:

convert coefficients of the output ciphertext into a plurality of slots of an input vector according to the FHE scheme;

perform a modular reduction approximated by a scaled sine function on each slot of the plurality of slots to generate a plurality of reduced slots; and evaluate an activation function for the plurality of reduced slots to generate an output vector.

2. The server of claim 1, wherein the one or more convolved polynomials are a plurality of convolved polynomials, and wherein the at least one processor, individually or in combination, is further configured to:

select a subset of coefficients from each convolved polynomial of the plurality of convolved polynomials based on a scaled geometric sequence with a common ratio of two between each successive term in the geometric sequence; and use the selected subset of coefficients from each convolved polynomial to form the output ciphertext.

3. The server of claim 1, wherein the input polynomial and the one or more kernel polynomials are encoded as polynomials in a ring of polynomials expressed as $\mathcal{R}=\mathbb{Z}[X]/(X^N+1)$ with N being a power of two and $\mathbb{Z}[X]$ denoting integral coefficients of the polynomials in the ring.

4. The server of claim 3, wherein N is set as greater than or equal to the larger of $Bw^2$ and $Bk^2$, where B is a total number of input datasets encoded into the plaintext polynomial, w is a row size or a column size of each input dataset, and k is a row size or a column size of each batch kernel of the kernel that is used in the convolution for each input dataset.

5. The server of claim 1, wherein in performing the modified bootstrapping, the at least one processor, individually or in combination, is further configured to at least:

extract values from the output vector based on a stride for a first convolutional layer of a Convolutional Neural Network (CNN) including the convolution; and convert the extracted values into output coefficients of an encrypted result polynomial according to the FHE scheme.

6. The server of claim 5, wherein the at least one processor, individually or in combination, is further configured to set the encrypted result polynomial as a new input polynomial for a second convolutional layer of the CNN including a second convolution performed by at least in part separately multiplying the new input polynomial by one or more second layer kernel polynomials including second layer kernel coefficients encoded using second layer kernel values for a second layer kernel.

7. A method, comprising:

receiving from a client device an input ciphertext including at least encrypted coefficients of an input polynomial, wherein the encrypted coefficients have been encrypted according to a Fully Homomorphic Encryption (FHE) scheme after encoding one or more input datasets of real numbers into a plaintext polynomial;

encoding a kernel into one or more kernel polynomials using kernel values from the kernel as kernel coefficients in the one or more kernel polynomials;

performing a convolution on the input ciphertext at least in part by separately multiplying the input polynomial by the one or more kernel polynomials to result in one or more corresponding convolved polynomials;

using at least a plurality of coefficients in each of the one or more convolved polynomials to derive an output ciphertext representing an output of the convolution on the input ciphertext using the kernel; and performing a modified bootstrapping on the output ciphertext by at least:

converting coefficients of the output ciphertext into a plurality of slots of an input vector according to the FHE scheme;

performing a modular reduction approximated by a scaled sine function on each slot of the plurality of slots to generate a plurality of reduced slots; and evaluating an activation function for the plurality of reduced slots to generate an output vector.

8. The method of claim 7, wherein the one or more convolved polynomials are a plurality of convolved polynomials, and wherein the method further comprises:

selecting a subset of coefficients from each convolved polynomial of the plurality of convolved polynomials based on a scaled geometric sequence with a common ratio of two between each successive term in the geometric sequence; and using the selected subset of coefficients from each convolved polynomial to form the output ciphertext.

9. The method of claim 7, wherein the input polynomial and the one or more kernel polynomials are encoded as polynomials in a ring of polynomials expressed as $\mathcal{R}=\mathbb{Z}[X]/(X^N+1)$ with N being a power of two and $\mathbb{Z}[X]$ denoting integral coefficients of the polynomials in the ring.

10. The method of claim 9, wherein N is set as greater than or equal to the larger of $Bw^2$ and $Bk^2$, where B is a total number of input datasets encoded into the plaintext polynomial, w is a row size or a column size of each input dataset, and k is a row size or a column size of each batch kernel of the kernel that is used in the convolution for each input dataset.

11. The method of claim 7, further comprising:

extracting values from the output vector based on a stride for a first convolutional layer of a Convolutional Neural Network (CNN) including the convolution; and converting the extracted values into output coefficients of an encrypted result polynomial according to the FHE scheme.

12. The method of claim 11, further comprising setting the encrypted result polynomial as a new input polynomial for a second convolutional layer of the CNN including a second convolution performed by at least in part separately multiplying the new input polynomial by one or more second layer kernel polynomials including second layer kernel coefficients encoded using second layer kernel values for a second layer kernel.

13. A client device, comprising:

an interface configured to communicate with a server; and at least one processor, individually or in combination, configured to:

encode one or more input datasets of real numbers into a plaintext polynomial with integral coefficients that do not include an imaginary component in a ring of polynomials expressed as $\mathcal{R}=\mathbb{Z}[X]/(X^N+1)$ with N being a power of two and $\mathbb{Z}[X]$ denoting integral coefficients of the polynomials in the ring;

generate an input ciphertext by encrypting the plaintext polynomial using a first key according to a Fully Homomorphic Encryption (FHE) scheme, wherein the input ciphertext includes at least encrypted coefficients of an input polynomial; and send the input ciphertext to the server via the interface for the server to perform at least one convolution on the input polynomial.

14. The client device of claim 13, wherein the at least one processor, individually or in combination, is further configured to:

receive an encrypted result polynomial from the server via the interface;

decrypt the encrypted result polynomial according to the FHE scheme using a secret key to derive a decrypted polynomial; and determine one or more Convolutional Neural Network (CNN) results for the one or more input datasets by decoding the decrypted polynomial using decrypted coefficients of the decrypted polynomial.

15. The client device of claim 13, wherein the at least one processor, individually or in combination, is further configured to encode the one or more input datasets of real numbers into the plaintext polynomial by at least:

separately multiplying the real numbers of the one or more input datasets by a scaling factor; and determining coefficients of the plaintext polynomial by rounding each of the corresponding products of the real numbers and the scaling factor to a nearest integer.

16. The client device of claim 15, wherein the at least one processor, individually or in combination, is further configured to:

determine if a total size of the one or more input datasets is equal to N divided by $2^S$, wherein s is a positive integer greater than zero; and in response to determining that the total size of the one or more input datasets is equal to N divided by $2^S$, increase degrees of terms in the plaintext polynomial by a factor of $2^S$.

17. The client device of claim 15, wherein the at least one processor, individually or in combination, is further configured to:

determine if a total size of a plurality of input datasets is larger than N; and in response to determining that the total size of the plurality of input datasets is larger than N, set a subset of input datasets from the plurality of input datasets as the one or more input datasets for encoding into the plaintext polynomial.

18. A method, comprising:

encoding one or more input datasets of real numbers into a plaintext polynomial by:

separately multiplying the real numbers of the one or more input datasets by a scaling factor;

determining coefficients of the plaintext polynomial by rounding each of the corresponding products of the real numbers and the scaling factor to a nearest integer; and using the determined coefficients as coefficients in the plaintext polynomial, wherein the plaintext polynomial is in a ring of polynomials expressed as $\mathcal{R}=\mathbb{Z}[X]/(X^N+1)$ with N being a power of two and $\mathbb{Z}[X]$ denoting integral coefficients of the polynomials in the ring;

generating an input ciphertext by encrypting the plaintext polynomial using a first key according to a Fully Homomorphic Encryption (FHE) scheme, wherein the input ciphertext includes at least encrypted coefficients of an input polynomial; and sending the input ciphertext to a server to perform at least one convolution on the input polynomial using at least one kernel.

19. A system, comprising:

a client device including at least one processor, individually or in combination, configured to:

encode one or more input datasets of real numbers into a plaintext polynomial with integral coefficients that do not include an imaginary component, wherein the plaintext polynomial is in a ring of polynomials expressed as $\mathcal{R}=\mathbb{Z}[X]/(X^N+1)$ with N being a power of two and $\mathbb{Z}[X]$ denoting integral coefficients of the polynomials in the ring; and generate an input ciphertext by encrypting the plaintext polynomial using a first key according to a Fully Homomorphic Encryption (FHE) scheme, wherein the input ciphertext includes at least encrypted coefficients of an input polynomial; and a server including means for:

receiving the input ciphertext from the client device;

performing a convolution on the input ciphertext using a kernel by at least in part separately multiplying the input polynomial by one or more kernel polynomials to result in one or more corresponding convolved polynomials, wherein the one or more kernel polynomials include kernel coefficients encoded using kernel values for the kernel; and using at least a plurality of coefficients in each of the one or more convolved polynomials to derive an output ciphertext representing an output of the convolution on the input ciphertext using the kernel.

20. The system of claim 19, wherein the at least one processor of the client device, individually or in combination, is further configured to encode the one or more input datasets of real numbers into the plaintext polynomial by at least:

separately multiplying the real numbers of the one or more input datasets by a scaling factor; and determining coefficients of the plaintext polynomial by rounding each of the corresponding products of the real numbers and the scaling factor to a nearest integer.

21. The system of claim 19, wherein the server further includes means for:

performing a modified bootstrapping on the output ciphertext by at least:

converting coefficients of the output ciphertext into a plurality of slots of an input vector according to the FHE scheme;

performing a modular reduction approximated by a scaled sine function on each slot of the plurality of slots to generate a plurality of reduced slots; and evaluating an activation function for the plurality of reduced slots to generate an output vector.

* * * * *